United States Patent
Zhang et al.

(10) Patent No.: US 9,453,099 B2
(45) Date of Patent: Sep. 27, 2016

(54) COVALENTLY CROSS-LINKED MALLEABLE POLYMERS AND METHODS OF USE

(71) Applicant: The Regents of the University of Colorado, a body corporate, Denver, CO (US)

(72) Inventors: Wei Zhang, Superior, CO (US); Philip Taynton, Morrison, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 14/656,684

(22) Filed: Mar. 12, 2015

(65) Prior Publication Data

US 2015/0259458 A1  Sep. 17, 2015

Related U.S. Application Data

(60) Provisional application No. 61/951,613, filed on Mar. 12, 2014.

(51) Int. Cl.

| | | |
|---|---|---|
| C08G 12/06 | (2006.01) | |
| C08K 7/06 | (2006.01) | |
| C08G 14/06 | (2006.01) | |
| C08K 7/14 | (2006.01) | |
| C08K 7/24 | (2006.01) | |
| C08L 79/02 | (2006.01) | |

(52) U.S. Cl.
CPC .............. *C08G 12/06* (2013.01); *C08G 14/06* (2013.01); *C08K 7/06* (2013.01); *C08K 7/14* (2013.01); *C08K 7/24* (2013.01); *C08K 2201/011* (2013.01); *C08L 79/02* (2013.01)

(58) Field of Classification Search
CPC ...... C08G 12/06; C08G 73/00; C08G 14/06; C08L 79/02
See application file for complete search history.

(56) References Cited

PUBLICATIONS

Belowich et al "Dynamic imine chemistry" Chem. Soc. Rev., 2012, 41, 2003-2024, Dec. 2012.*
Ciaccia et al "Fast transimination in organic solvents in the absence of proton and metal catalysts. A key to imine metathesis catalyzed by primary amines under mild conditions", Chem. Sci., 2013, 4, 2253, Nov. 2012.*

* cited by examiner

*Primary Examiner* — Gregory Listvoyb
(74) *Attorney, Agent, or Firm* — Saul Ewing LLP; Kathryn Doyle; Domingos J. Silva

(57) ABSTRACT

Disclosed herein are compositions and methods of making novel covalently cross-linked polyimines that non-malleable under standard conditions but yet may be rendered malleable.

19 Claims, 26 Drawing Sheets

COVALENTLY CROSS-LINKED MALLEABLE POLYMERS AND METHODS OF USE

CROSS-REFERENCE TO RELATED APPLICATION

This application claims priority to U.S. provisional application No. 61/951,613 filed on Mar. 12, 2014, which is herein incorporated by reference in its entirety and for all purposes.

STATEMENT REGARDING FEDERALLY SPONSORED RESEARCH

This invention was made with government support under grant number DMR1055705 awarded by the National Science Foundation. The government has certain rights in the disclosure.

FIELD OF INVENTION

The present invention generally relates to malleable polymers and their methods of use.

BACKGROUND

Polymers with covalently cross-linked networks are commonly referred to as thermosets. Thermosets get this name from the fact that they cannot flow upon heating and thus cannot be reshaped and recycled. Conventional network polymers, such as thermosets, obtain their shape as they are synthesized. After taking shape, they cannot be reprocessed and recycled, see Aklonis & MacKnight, Introduction to Polymer Viscoelasticity, 2nd ed., New York: Wiley, 1983.

In contrast to thermosets, network polymers with dynamic covalent bonds (DCB) allow for bond exchange reactions (BER) that can alter network topology. In DCB polymers, the covalently connected backbone of the macromolecular chain can cleave then reconnect through bond exchange reactions (BER). Such dynamic covalent bond reformation activities do not change the network topology and properties, but enable macroscopic stress relaxation and material welding.

DCB polymers that have been synthesized either require the inclusion of expensive catalysts (see, for example, WO2014086974A1 to Leibler et al.) and/or have BER that are highly active under ambient conditions, and thus cannot replace most thermoset materials.

SUMMARY

Disclosed herein are novel polyimine DCB polymers compositions which do not require a catalyst, and exhibit thermoset-like behavior at room temperature. Polyimine DCB polymers disclosed herein exhibit reprocessability and recyclability at elevated temperature without inclusion of catalysts, and further exhibit a very unique moisture-trigger for stress relaxation which can be modulated by monomer choice. The polyimine DCB polymers disclosed herein are robust, yet remoldable.

Also disclosed herein are methods for making and using polyimine DCB polymers as well as composite materials that incorporate polyimine DCB polymers. These polymers and composite materials are moldable and reshapeable like thermoplastic sheet stock. Further disclosed are methods for using the novel polyimine DCB polymers disclosed herein.

In an aspect, a polyimine polymer is disclosed capable of repeating at least one cycle of transitioning between a non-malleable state and a malleable state and between a malleable state and a non-malleable state upon exposure to a temperature range having a low temperature range that is below a transitional temperature wherein said polymer exhibits rates of bond exchange reactions that impart a non-malleable state to said polymer and a high temperature range above said transitional temperature wherein said polymer exhibits rates of bond exchange reactions that impart a malleable state to said polymer. In an embodiment, the polyimine polymer is a vitrimer. In another embodiment, the polyimine polymer exhibits a bond exchange reaction that is selected from an imine formation reaction, an imine exchange reaction, and an imine hydrolysis reaction. In another embodiment, the polyimine polymer has a transitional temperature is from about 10° C. to about 250° C. In yet another embodiment, the polyimine polymer has a transition temperature is from about 30° C. to about 250° C. In an embodiment, the polyimine polymer has a transitional temperature is from about 30° C. to about 100° C. In another embodiment, the polyimine polymer has a transitional temperature at about 56° C. In an embodiment, the polyimine polymer exhibits a Young's modulus of between about 1.0 and about 1.8 GPa. In another embodiment, the polyimine polymer exhibits a Tensile Strength modulus of between about 40 and about 58 MPa. In another embodiment, the polyimine polymer exhibits a Processing Temperature of about 80° C. In an embodiment, the polyimine polymer exhibits a Young's modulus of between about 1.0 and about 1.8 GPa and a Tensile Strength modulus of between about 40 and about 58 MPa and a Processing Temperature of about 80° C. In yet another embodiment, the polyimine polymer has a stress relaxation that exhibits Arrhenius-like temperature dependence. In an embodiment, the polyimine polymer does not contain a catalyst. In yet another embodiment, the polyimine polymer is elastomeric, and capable of strains in excess of 150% elongation. In an embodiment, the polyimine polymer is hydrophobic, and exhibits less than 10% weight increase when immersed in an aqueous solution for 24 h. In an embodiment, the polyimine polymer is immersed in an aqueous solution that is water. In another embodiment, the polyimine polymer has dicarbonyl monomers, diamine monomers, and cross-linking agents. In another embodiment, the polyimine polymer is prepared by condensation of at least one dicarbonyl monomer, at least one diamine monomer, and at least one cross-linking agent. In an embodiment, the polyimine polymer has at least one cross-linking agent that is a multivalent carbonyl monomer or a multivalent amine monomer. In an embodiment, the polyimine polymer has at least one dicarbonyl monomer that has at least one aromatic aldehyde group. In another embodiment, the polyimine polymer has a dicarbonyl monomer that includes glyoxal, malonaldehyde, glutaraldehyde, 2,3-thiophenedicarbaldehyde, 2,5-thiophenedicarbaldehyde, 3-formylfurfural, 5-formylfurfural, 2,6-pyridinedicarboxaldehyde, 3,6-pyridinedicarboxaldehyde, 3,5-pyridinedicarboxaldehyde, isophthaldehyde, terephthaldehyde, phthaldialdehyde, phenylglyoxal, pyrroledicarboxaldehyde, 2,3-butanedione, 2,4-pentanedione, 4-cyclopentene-1,3-dione, 1,3-cyclopentanedione, 1,2-benzoquinone, 1,4-benzoquinone, cyclohexanedione, 3,4-dihydroxy-3-cyclobutene-1,2-dione, 1,3-indandione, ninhydrin, 1,4-naphthoquinone, 1,2-naphthoquinone, diacetylbenzene, acenaphthenequinone, and anthraquinone. In an embodiment, the polyimine polymer has at least one diamine monomer that has at least one aliphatic amine group. In another embodiment, the polyimine polymer has at least one diamine monomer that includes a hydrazine, ethylenediamine, propylenediamine, 1,4-diaminobutane, 1,5-diaminopentane, 1,6-diaminohexane, 1,7-diaminoheptane, 1,8-diaminooctane, 1,9-diaminononane, 1,10-diaminodecane, phenylenediamine, phenylenedimethylenamine, diaminocyclohexane, diaminocyclopentane, diaminocyclobutane, diaminothiophene, diaminopyridine, diaminopyrrole, diaminofuran, diaminoimidazole, diaminooxazole, 3,6,9-trioxaundecan-1,11-diamine, and diethylenetriamine. In another embodiment, the polyimine polymer has at least one multivalent amine monomer including triethylenetetramine, 3-ethylamino-1,5-diaminopentane, triaminobenzene, and triaminocyclohexane. In an embodiment, the polyimine polymer includes multivalent carbonyl monomer comprises benzene-1,3,5-tricarboxaldehyde, 2,4,6-trihydroxy-1,3,5-benzenetricarboxaldehyde, hexaketocyclohexane, and 2-acetyl-1,3-cyclohexanedione. In an embodiment, the polyimine polymer includes at least one dicarbonyl monomer, at least one diamine monomer, and at least one cross-linking agent are reacted in amounts such that the molar equivalent ratios for (i) carbonyl groups from the dicarbonyl monomer, (ii) amine groups from the diamine monomer, and (iii) amine groups or carbonyl groups from the cross-linking agent range from about 1:0.99:0.01 to about 1:0.01:0.99. In yet another embodiment, the polyimine polymer has at least one dicarbonyl monomer, at least one diamine monomer, and at least one cross-linking agent that are reacted in amounts such that the molar equivalent ratios for total amino groups to total carbonyl groups is about 1:1. In another embodiment, the polyimine polymer includes a difunctional monomer including a carbonyl group, and a protected primary amine wherein a difunctional monomer polymerizes upon deprotection of a protected primary amine. In an embodiment, the polyimine polymer includes a cross-linking agent. In another embodiment, the polyimine polymer includes a cross-linking agent that has a multivalent carbonyl monomer or a multivalent amine monomer. In an embodiment, the polyimine polymer includes a difunctional monomer including a protected carbonyl group, and a primary amine wherein the difunctional monomer polymerizes upon deprotection of the protected carbonyl group. In an embodiment, the polyimine polymer includes a cross-linking agent. In yet another embodiment, the polyimine polymer has a cross-linking agent that includes a multivalent carbonyl monomer or a multivalent amine monomer.

In another aspect, a polyimine polymer capable of repeating at least one cycle of transitioning between a non-malleable state and a malleable state and between a malleable state and a non-malleable state upon exposure to a range of relative humidity has a low humidity range that is below a transitional relative humidity point wherein said polymer exhibits rates of bond exchange reactions that impart a non-malleable state to the polymer; and a high humidity range above said transitional relative humidity point wherein said polymer exhibits rates of bond exchange reactions that impart a malleable state to the polymer. In an embodiment, the polyimine polymer is a vitrimer. In another embodiment, the polyimine polymer has a bond exchange reaction is selected from an imine formation reaction, an imine exchange reaction, and an imine hydrolysis reaction. In another embodiment, the polyimine polymer has a transitional relative humidity point that is from about 50 to about 90 percent relative humidity. In yet another embodiment, the polyimine polymer has a transitional relative humidity point is from about 70 to about 90 percent relative humidity. In an embodiment, the polyimine polymer has a high humidity range that is caused by immersion in an aqueous solution. In an embodiment, the polyimine polymer has a high humidity range that is caused by immersion in an aqueous solution that is water. In an embodiment, the polyimine polymer has a non-malleable state of the polymer that exhibits a Young's modulus of between about 1.0 and about 1.8 GPa. In an embodiment, the polyimine polymer has a non-malleable state of the polymer that exhibits a Tensile Strength modulus of between about 40 and about 58 MPa. In another embodiment, the polyimine polymer exhibits a Young's modulus of between about 1.0 and about 1.8 GPa and a Tensile Strength modulus of between about 40 and about 58 MPa and a Processing Temperature of about 80° C. In an embodiment, the polyimine polymer has a stress relaxation of the non-malleable state of the polyimine polymer that exhibits Arrhenius-like temperature dependence. In an embodiment, the polyimine polymer does not contain a catalyst. In an embodiment, the polyimine polymer of contains dicarbonyl monomers, diamine monomers, and cross-linking agents. In an embodiment, the polyimine polymer is prepared by condensation of at least one dicarbonyl monomer, at least one diamine monomer, and at least one cross-linking agent. In an embodiment, the polyimine polymer contains at least one dicarbonyl monomer, and at least one diamine monomer, and the at least one cross-linking agent are reacted in amounts such that the molar equivalent ratios for (i) carbonyl groups from the dicarbonyl monomer, (ii) amine groups from the diamine monomer, and (iii) amine groups or carbonyl groups from the cross-linking agent range from about 1:0.99:0.01 to about 1:0.01:0.99. In another embodiment, the polyimine polymer contains at least one dicarbonyl monomer, and the at least one diamine monomer, and the at least one cross-linking agent are reacted in amounts such that the molar equivalent ratios for total amino groups to total carbonyl groups is about 1:1.

In an aspect, a polyimine polymer capable of repeating at least one cycle of transitioning between a non-malleable state and a malleable state and between a malleable state and a non-malleable state upon exposure to a temperature range includes a low temperature range that is below a transitional temperature wherein the polymer exhibits rates of bond exchange reactions that impart a non-malleable state to the polymer, and includes a high temperature range above the transition temperature wherein said polymer exhibits rates of bond exchange reactions that impart a malleable state to the polymer, and wherein the polyimine polymer comprises a metal additive, and wherein the metal additive results in an increase in the transition temperature relative to the polyimine polymer without the metal additive. In an embodiment, the polyimine polymer is a vitrimer. In another embodiment, the bond exchange reaction is selected from an imine formation reaction, an imine exchange reaction, and an imine hydrolysis reaction. In an embodiment, the polyimine polymer includes a transition temperature that is from about 10° C. to about 250° C. In another embodiment, the polyimine polymer includes a transition temperature that is from about 30° C. to about 250° C. In yet another embodiment, the polyimine polymer includes a transition temperature that is from about 30° C. to about 100° C. In an embodiment, the polyimine polymer has a transitional temperature that is about 80° C. In another embodiment, the polyimine polymer includes a metal additive that is selected from the group of Scandium and Copper.

In an aspect, a composite material including a polyimine polymer binder and a filler capable of repeating at least one cycle of transitioning between a non-malleable state and a malleable state and between a malleable state and a non-malleable state upon exposure to a temperature range includes a low temperature range that is below a transitional temperature wherein the polymer exhibits rates of bond exchange reactions that impart a non-malleable state to the polymer, and a high temperature range above the transition temperature wherein the polymer exhibits rates of bond exchange reactions that impart a malleable state to the polymer. In an embodiment, the composite material includes a ratio of the binder to the filler is from about 9:1 to about 1:9. In yet another embodiment, the composite material includes carbon fiber, fiberglass, kevlar, ultra-high molecular weight polyethylene, and carbon nanotubes. In another embodiment, a method of processing the composite material includes, a.) contacting the composite material with a liquid including at least a molecule that has a primary amine moiety; and b.) allowing the composite material to substantially dissolve in the liquid of step a.); and c.) seperating a polymer solution from a fibrous or non-fibrous filler material. In another embodiment, a method of recycling the composite material includes: a.) contacting the composite material with a liquid including at least a molecule with a primary amine moiety; and b.) allowing the composite material to substantially dissolve in the liquid of step a.); and c.) seperating a polymer solution from a fibrous or non-fibrous filler material; and d.) using the polymer solution from step c.) to prepare polyimine polymers; and e.) using filler materials from step c.) to prepare composite materials.

In yet another aspect, a composite material including a polyimine polymer binder and a filler capable of repeating at least one cycle of transitioning between a non-malleable state and a malleable state and between a malleable state and a non-malleable state upon exposure to a range of relative humidity includes a low humidity range that is below a transitional relative humidity point wherein the polymer exhibits rates of bond exchange reactions that impart a non-malleable state to the polymer; and a high humidity range above the transitional relative humidity point wherein the polymer exhibits rates of bond exchange reactions that impart a malleable state to the polymer. In an embodiment, the composite material has a ratio of the binder to the filler that is from about 9:1 to about 1:9. In another embodiment, the composite material includes carbon fiber, fiberglass, kevlar, ultra-high molecular weight polyethylene, and carbon nanotubes. In yet another embodiment, a method of processing the composite material includes: a.) contacting the composite material with a liquid comprising at least a molecule that has a primary amine moiety; and b.) allowing the composite material to substantially dissolve in the liquid of step a.); and c.) seperating a polymer solution from a fibrous or non-fibrous filler material. In yet another embodiment, a method of recycling the composite material includes: a.) contacting the composite material with a liquid including at least a molecule with a primary amine moiety; and b.) allowing the composite material to substantially dissolve in the liquid of step a.); and c.) seperating a polymer solution from a fibrous or non-fibrous filler material; and d.) using the polymer solution from step c.) to prepare polyimine polymers; and e.) using filler materials from step c.) to prepare composite materials.

In an aspect, a method for making the composite material includes: a.) combining at least one polyimine polymer layer in between at least two plies of composite; and b.) heating said combined layers and plies of step a.) to a temperature above said transitional temperature; and c.) pressing the heated combined layers and plies of step b.) into a mold; and d.) allowing the heated combined layers and plies of step c.) to cool to a temperature below the transitional temperature. In an embodiment, the composite material is an orthotic.

In an aspect, a method for making a composite material includes: a.) combining at least one polyimine polymer layer in between at least two plies of composite; and b.) wetting the combined layers and plies of step a.) to a high humidity range above said transitional relative humidity point; and c.) pressing the combined layers and plies of step b.) into a mold; and d.) allowing the combined layers and plies of step c.) to dry to a low humidity range below said transitional relative humidity point. In an embodiment, the composite material is an orthotic.

In another aspect, a polyimine polymer capable of repeating at least one cycle of transitioning between a non-malleable state and a malleable state and between a malleable state and a non-malleable state upon exposure to a temperature range includes a low temperature range that is below a transitional temperature wherein the polymer exhibits rates of bond exchange reactions that impart a non-malleable state to said polymer; and also includes a high temperature range above the transitional temperature wherein the polymer exhibits rates of bond exchange reactions that impart a malleable state to the polymer; and wherein the polyimine polymer is capable of self-healing in the low temperature range.

In an aspect, a polyimine polymer capable of repeating at least one cycle of transitioning between a non-malleable state and a malleable state and between a malleable state and a non-malleable state upon exposure to a range of relative humidity includes a low humidity range that is below a transitional relative humidity point wherein the polymer exhibits rates of bond exchange reactions that impart a non-malleable state to the polymer; and a high humidity range above the transitional relative humidity point wherein the polymer exhibits rates of bond exchange reactions that impart a malleable state to the polymer; and wherein the polyimine polymer is capable of self-healing in said low humidity range.

BRIEF DESCRIPTION OF THE DRAWINGS

FIG. 19 also depicts the percent swelling after soaking in water for 24 hrs and a tensile test of the respective polymers.

DETAILED DESCRIPTION

Figure 1:
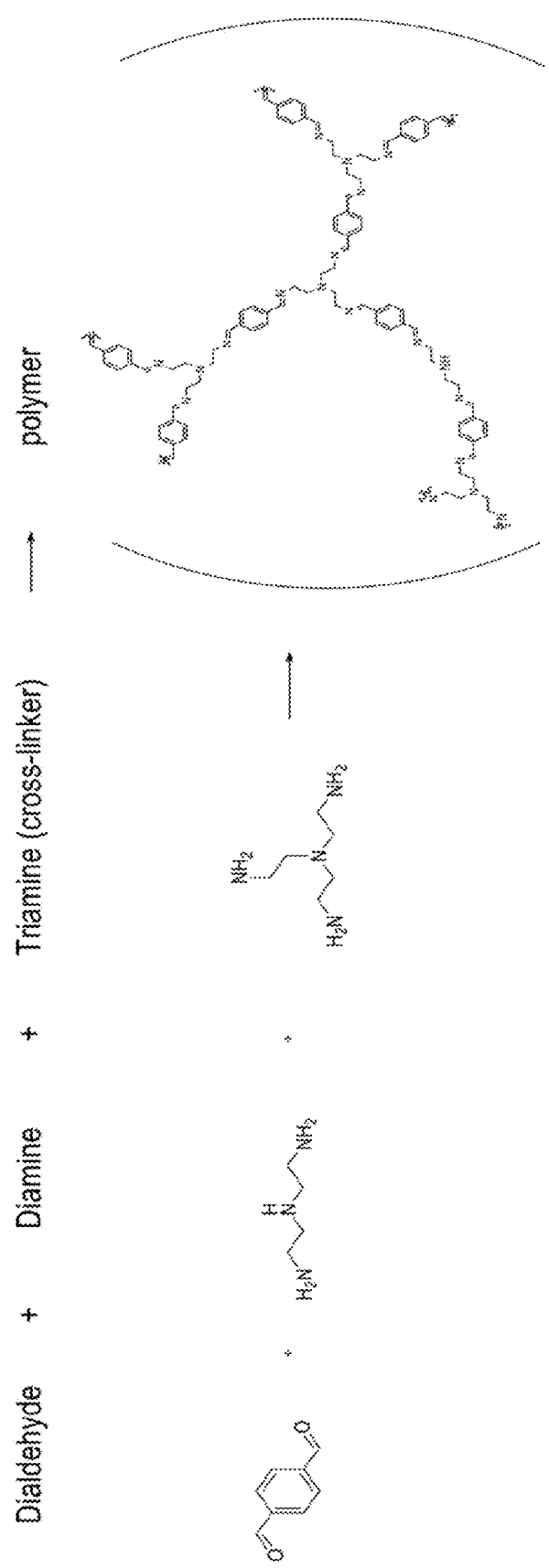
FIG. 1 depicts a general reaction scheme with dialdehyde, diamine and triamines being combined to make polyimine polymers.

Disclosed herein are novel polyimine DCB polymers compositions which do not require a catalyst, and exhibit thermoset-like behavior at room temperature.

The imine-linked polymer, also referred to herein as a polyimine polymer, is a robust system for the development of dynamic covalent networks. An imine (also known as a Schiff base) is a carbon-nitrogen double bond typically formed by a condensation reaction between a primary amine and either an aldehyde or ketone. Since imine condensation simply requires an amine and an aldehyde or ketone, there is a wide variety of suitable monomers that are commercially available. Also, though imine condensation and imine exchange have been shown to be catalyzed by both Bronsted and Lewis acid catalysts, the reactions take place at reasonable rates at elevated temperatures even in the absence of a catalyst. Thus polyimines disclosed herein can be used for creating simple, easily accessible, and inexpensive malleable polymer networks useful for the development of reprocessible, functional polymeric materials in a variety of industrially and environmentally important applications such as self-healing polymers, solid-state adhesives, custom moldable protective equipment, custom moldable orthotic devices, moisture responsive smart polymers, corrosion-resistant coatings, among other applications.

Non-limiting examples of imine reactions utilized in making imine polymers disclosed herein include imine formation, imine exchange, imine hydrolysis and imine reduction as depicted in Scheme 1 as follows:

Scheme 1:

Imine formation:

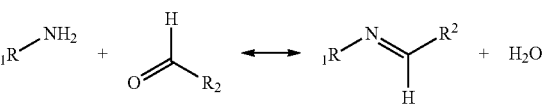

Imine exchange:

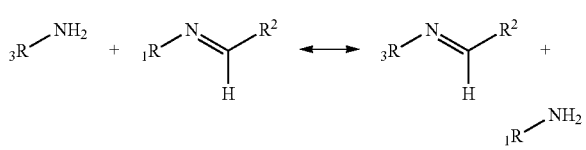

Imine hydrolysis:

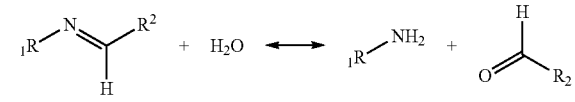

Imine reduction:

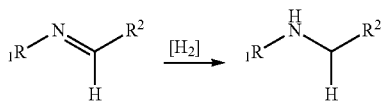

Without being limited by theory, stress relaxation mechanisms may be explained according to the following theory. At a single chain level, when BER occurs, the load in the original loaded chain will be transferred to a newly connected unloaded chain, thus the overall force is decreased.

The imine exchange reaction utilized herein is able to relax stress within the polymers at easily obtainable elevated temperatures without a catalyst. A catalyst free malleable material has the advantage of simplicity, lower toxicity and a lower price to manufacture. In an embodiment, tunability of the bond exchange kinetics and other properties of the polymers disclosed herein is achieved through monomer choice. Thus, considering the wide variety of commercially available monomers, and enormous range of properties is possible. In an embodiment, a catalyst and/or added metal can provide additional tunablity of the properties of the polymers.

DEFINITIONS

Unless defined otherwise, all technical and scientific terms used herein generally have the same meaning as commonly understood by one of ordinary skill in the art to which this disclosure belongs. Generally, the nomenclature used herein and the laboratory procedures in organic chemistry, and polymer chemistry are those well known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "rigid" as relating to a material refers to a material that cannot be (re)shaped, and/or (re)molded without suffering significant physical damage or injury. In an embodiment, the term "rigid" is synonymous with a material whose Young's modulus is higher than about 1.

As used herein, the term "dry form" as relating to a material refers to a material from which extraneous solvent (such as water) has been removed. In certain embodiments, a material in dry form is substantially free from all unbound solvent (such as absorbed or adsorbed solvent) therein. In other embodiments, a material in dry form still comprises solvent which is tightly bound to the material and can only be removed by physical or chemical methods that denature or damage the material. In yet other embodiments, when a material is contacted with a liquid and absorbs or adsorbs a portion of the liquid, the material is considered to be in dry form when the absorbed or adsorbed liquid is removed to the extent that the material has substantially the same weight as before being contacted with the liquid. A material may be dried by physical methods (such as heating, exposure to vacuum, or exposure to gas flow) and/or chemical methods (such as chemical reactions that consume solvent).

As used herein, the term "elevated temperature" refers to a temperature that is higher than room temperature. In one embodiment, the elevated temperature is about 20-25° C. above room temperature. In another embodiment, the elevated temperature is about 20-40° C. above room temperature. In an embodiment, the elevated temperature is about 20-50° C. above room temperature. In yet another embodiment, the elevated temperature is 5° C., 10° C., 15° C., 20° C., 25° C., 30° C., 35° C., 40° C., 45° C., 50° C., 55° C., or 60° C. above room temperature. In another embodiment, the elevated temperature is any temperature above ambient temperature up to about 60° C. above ambient temperature. In yet another embodiment, the elevated temperature is any temperature above ambient temperature up to about 100° C. above ambient temperature.

As used herein, the term "monomer" refers to any discreet chemical compound of any molecular weight.

As used herein, the term "polymer" refers to a molecule composed of repeating structural units typically connected by covalent chemical bonds. The term "polymer" is also meant to include the terms copolymer and oligomers. In one embodiment, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "polymerization" or "cross-linking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or cross-linking reaction may consume between about 0% and about 100% of the at least one functional group available in the system. In an embodiment, polymerization or cross-linking of at least one functional group results in about 100% consumption of the at least one functional group. In another embodiment, polymerization or cross-linking of at least one functional group results in less than about 100% consumption of the at least one functional group.

As used herein, the term "non-malleable" as relating to a state of matter refers to a state or condition of a material wherein when held under a constant strain at a constant temperature, less than 90% of the stresses within the material are relaxed within 72 hours. Further, the term "non-malleable" as relating to a material refers to a material which does not exhibit malleable behavior at any temperature at which the material is stable, i.e. not combusting or decomposing.

As used herein, the term "malleable" as relating to a state of matter refers to a state or condition of a material wherein when held under a constant strain at a constant temperature, at least 90% of the stresses within the material are relaxed within 72 hours. Further, the term "malleable" as relating to a material refers to a material that is able to become malleable when heated above its vitrimeric transition temperature.

As used herein, the term "vitrimeric transition temperature", denoted as "$T_v$," refers to the temperature at which a material is able to transition from the "non-malleable" state to the "malleable" state.

As used herein, the term "vitrimer" is used to describe a polymer (such as a plastic or a resin, for example) consisting of molecular, covalent networks, which can change its topology by thermally activated bond exchange reactions. At higher temperatures, vitrimers can flow like viscoelastic liquids, at low temperatures the bond exchange reactions are slow enough for the vitrimer to behave like a thermoset. In an embodiment, the temperature at which a transition between a vitrimer behaving like a thermoset and behaving like a viscoelastic liquid happens is referred to as the vitrimeric transition temperature ($T_v$).

As used herein, and in a non-limiting sense, the term "bond exchange reaction" also referred to by its acronym as "BER", and means that the network topology of a polymer can be rearranged due to the internal exchange of bonds between various monomers in a polymer at a high temperature and that the rearrangement substantially stops (is frozen) at a lower temperature. In an embodiment, in polymers that exhibit BER, the polymer viscosity is gradually changed versus temperature following an Arrhenius law relationship and during the rearrangement the network integrity of the polymer is maintained. In an embodiment, in a polymer that exhibits BER, because no additional monomers or termination reactions are introduced into the system, the numbers of links and average functionality of polymer chains are unchanged. In an embodiment, in polymers disclosed herein, thermally induced BER can release the internal stress of a polymer and allow the polymer to be reshaped, welded together, self-healed and reprocessed into a new shape.

As used herein, and in a non-limiting fashion, the term "topology" refers to spatial properties preserved under conditions of stretching without tearing.

As used herein, the term "viscoelastic material" is a material that exhibits at least the following properties; hysteresis is seen in a stress-strain curve, stress relaxation occurs; and creep occurs.

As used herein, the term "curable" as applied to a material refers to a material comprising at least one functional group that may undergo polymerization. The curable material may be non-polymerized (i.e., non-cured material), or may be submitted to polymerization conditions (such as chemical reagents or physical conditions) that induce polymerization of at least a fraction of the at least one polymerizable functional group (i.e., partially or fully cured material). In one embodiment, polymerization or cross-linking of the curable material results in about 100% consumption of the at least one functional group (i.e., fully cured). In another embodiment, polymerization or cross-linking of the curable material results in less than about 100% consumption of the at least one functional group (i.e., partially cured).

As used herein, the term "reaction condition" refers to a physical treatment, chemical reagent, or combination thereof, which is required or optionally required to promote a reaction. Non-limiting examples of reaction conditions are electromagnetic radiation, heat, a catalyst, a chemical reagent (such as, but not limited to, an acid, base, electrophile or nucleophile), and a buffer As used herein, the term "reactive" as applied to amine or carbonyl groups indicate that these groups, when submitted to appropriate conditions, may take part in the reaction in question.

As used herein, the term "carbonyl monomer" corresponds to a compound comprising at least an aldehyde group [—C(=O)H] and/or at least a ketone group [R—C(=O)—R], wherein each R is independently alkyl, cycloalkyl, alkenyl, cycloalkenyl, alkynyl, cycloalkynyl, aryl, heteroaryl or heterocyclyl], or a reactive oligomer or reactive polymer or pre-polymer having at least one aldehyde and/or ketone group. Suitable carbonyl monomers have one or preferably more aldehyde and/or ketone groups and may be of any molecular weight. In certain embodiments, the carbonyl monomer comprises two aldehyde groups or two keto groups. In other embodiments, the carbonyl monomer comprises three, four or more aldehyde and/or ketone groups. As used herein, a "multivalent carbonyl monomer" refers to a carbonyl monomer comprising three or more aldehyde and/or ketone groups.

As used herein, the term "aliphatic carbonyl group" as relating to a molecule refers to a molecule comprising an aldehyde and/or ketone group that is directly linked to an aliphatic group. In certain embodiments, the carbonyl monomer comprises two aliphatic aldehyde and/or ketone groups. In other embodiments, the carbonyl monomer comprises two or more aliphatic aldehyde and/or ketone groups. In yet other embodiments, the carbonyl monomer comprises three or more aliphatic aldehyde and/or ketone groups.

Examples of carbonyl monomers contemplated within the disclosure include, but are not limited to, dialdehydes (such as, but not limited to, glyoxal, malonaldehyde, glutaraldehyde, 2,3-thiophenedicarbaldehyde, 2,5-thiophene-dicarbaldehyde, 3-formylfurfural, 5-formylfurfural, 2,6-pyridinedicarboxaldehyde, 3,6-pyridinedicarboxaldehyde, 3,5-pyridinedicarboxaldehyde, isophthaldehyde, terephthaldehyde [such as 1,4-terephthalaldehyde (p-phthalaldehyde)], phthaldialdehyde, phenylglyoxal, and pyrroledicarboxaldehyde), diketones (such as, but not limited to, 2,3-butanedione, 2,4-pentanedione, 4-cyclopentene-1,3-dione, 1,3-cyclopentanedione, 1,2-benzoquinone, 1,4-benzoquinone, cyclohexanedione, 3,4-dihydroxy-3-cyclobutene-1,2-dione, 1,3-indandione, ninhydrin, 1,4-naphthoquinone, 1,2-naphthoquinone, diacetylbenzene, acenaphthenequinone, anthraquinone, and benzyl), multivalent aldehydes (such as, but not limited to, benzene-1,3,5-tricarboxaldehyde, 2,4,6-trihydroxy-1,3,5-benzenetricarboxaldehyde), multivalent ketones (such as, but not limited to, hexaketocyclohexane and 2-acetyl-1,3-cyclohexanedione), monomers comprising at least one primary amine and at least one carbonyl group (such as aminoacetophenone, 4-ethylaminoacetophenone, 4-aminobenzaldehyde, or 4-aminomethylbenzaldehyde).

As used herein, the term "amine monomer" corresponds to a compound comprising at least a primary amine group [—NH$_2$—], or a reactive oligomer or reactive polymer or pre-polymer having at least one primary amine group. Suitable amine monomers have one or preferably more primary amine groups and may be of any molecular weight. In certain embodiments, the amine monomer comprises two primary amine groups. In other embodiments, the amine monomer comprises three, four or more primary amine groups.

As used herein, a "multivalent amine monomer" refers to an amine monomer comprising three or more primary amine groups.

As used herein, the term "aliphatic amine group" as relating to a molecule refers to a molecule comprising a primary amine group that is directly linked to an aliphatic group. In certain embodiments, the amine monomer comprises two aliphatic primary amine groups. In other embodiments, the amine monomer comprises two or more aliphatic primary amine groups.

In yet other embodiments, the amine monomer comprises three or more aliphatic primary amine groups.

Examples of amine monomers contemplated within the disclosure include, but are not limited to, diamines (such as, but not limited to, hydrazine, ethylenediamine, propylenediamine, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 3,3'-diamino-N-methyl-dipropylamine, phenylenediamine, phenylenedimethylenamine, diaminocyclohexane, diaminocyclopentane, diaminocyclobutane, diaminothiophene, diaminopyridine, diaminopyrrole, diaminofuran, diaminoimidazole, diaminooxazole, 3,6,9-trioxaundecan-1,11-diamine, and diethylenetriamine) multivalent amines (such as, but not limited to, tris(2aminoethyl) amine, 3-ethylamino-1,5-diaminopentane, triaminobenzene, and triaminocyclohexane), and monomers comprising at least one primary amine and at least one carbonyl group (such as aminoacetophenone, 4-ethylaminoacetophenone, 4-aminobenzaldehyde, or 4-aminomethylbenzaldehyde).

The term "aliphatic" or "aliphatic group" as used herein means a straight-chain or branched hydrocarbon chain that is completely saturated or that contains one or more units of unsaturation, or a monocyclic hydrocarbon or bicyclic hydrocarbon that is completely saturated or that contains one or more units of unsaturation, but which is not aromatic (also referred to herein as "carbocycle" or "cycloalkyl"), that has a single point of attachment to the rest of the molecule wherein any individual ring in said bicyclic ring system has 3-7 members. For example, suitable aliphatic groups include, but are not limited to, linear or branched or alkyl, alkenyl, alkynyl groups and hybrids thereof such as (cycloalkyl)alkyl, (cycloalkenyl)alkyl or (cycloalkyl)alkenyl.

The terms "alkyl" and "alkoxy," used alone or as part of a larger moiety include both straight and branched carbon chains. The terms "alkenyl" and "alkynyl" used alone or as part of a larger moiety shall include both straight and branched carbon chains.

The term "heteroatom" means nitrogen, oxygen, or sulfur and includes any oxidized form of nitrogen and sulfur, and the quaternized form of any basic nitrogen.

The term "aryl" used alone or in combination with other terms, refers to monocyclic, bicyclic or tricyclic carbocyclic ring systems having a total of five to fourteen ring members, wherein at least one ring in the system is aromatic and wherein each ring in the system contains 3-8 ring members. The term "aryl" may be used interchangeably with the term "aryl ring".

The term "aralkyl" refers to an alkyl group substituted by an aryl. The term "aralkoxy" refers to an alkoxy group. The term "heterocycloalkyl," "heterocycle," "heterocyclyl" or "heterocyclic" as used herein means monocyclic, bicyclic or tricyclic ring systems having five to fourteen ring members in which one or more ring members is a heteroatom, wherein each ring in the system contains 3-7 ring members and is non-aromatic.

As used herein, the term "instructional material" includes a publication, a recording, a diagram, or any other medium of expression that may be used to communicate the usefulness of the compositions of the disclosure. In some instances, the instructional material may be part of a kit useful for generating a malleable polymeric composition. The instructional material of the kit may, for example, be affixed to a container that contains the compositions of the disclosure or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

Throughout this disclosure, various aspects of embodiments herein may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Polyimine Polymers

Figure 2:
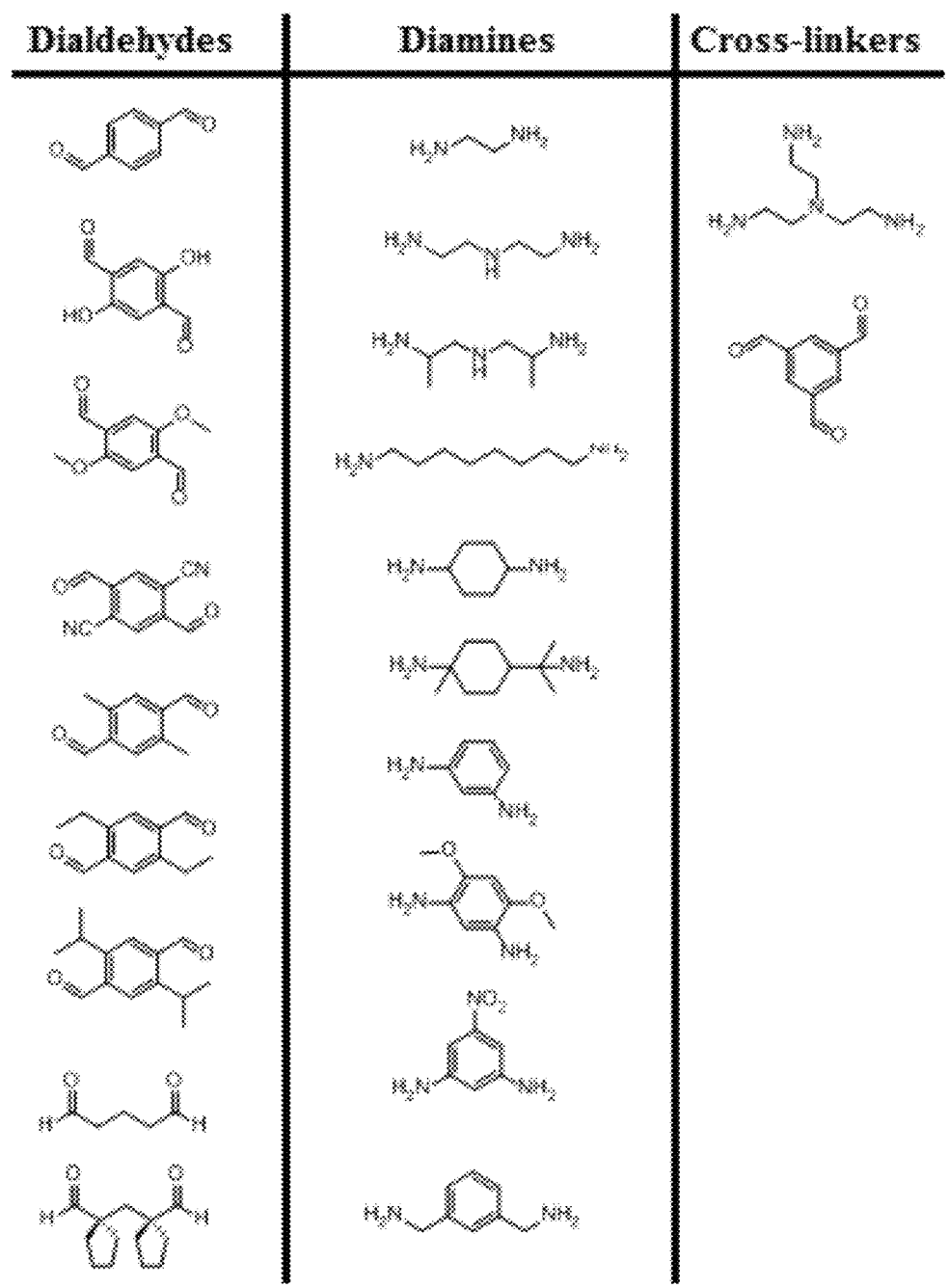
FIG. 2 depicts various dialdehydes, diamines and cross-linkers used to make polyimine polymers.

Compositions comprising polyimines are disclosed herein. In an embodiment, imine-linked polymers exhibiting dynamic imine chemistry are disclosed herein. In certain embodiments, the polyimine may be prepared from a dicarbonyl monomer, a diamine monomer, and a cross-linking agent as, for example, depicted in FIG. 1. In other embodiments, the cross-linking agent comprises a multivalent carbonyl monomer or a multivalent amine monomer. The wide variety of commercially available or easily prepared diamines, dialdehydes and diketones makes polyimines an accessible class of polymer to synthesize. A non-limiting representation of monomer diamines, dialdehydes, diketones that can be combined to make polyimines of the present disclosure is represented in FIG. 2. In an embodiment, a difunctional monomer containing, for example, a carbonyl group and a protected primary amine which could polymerize upon deprotection, can be formulated with crosslinkers to make polyimine polymers.

Table 1 lists various polymer materials and their respective Young's Modulus, Tensile Strength and Processing Temperature. In certain embodiments, the polyimines of the present disclosure are rendered malleable and properly shaped, healed or molded by application of heat and/or treatment with aqueous liquids, such as water. In other embodiments, the polyimines disclosed herein are recyclable through powder reprocessing. In an embodiment, the stress relaxation behavior of the polyimines of the disclosure has Arrhenius-like dependence on temperature.

TABLE 1

| Polymer Material | Young's Modulus (GPa) | Tensile Strength (MPa) | Processing Temperature (° C.) |
| --- | --- | --- | --- |
| HDPE | 1.0 | 20 | 180 |
| Polypropylene | 1.4 | 36 | 130 |
| Polyimine | 1.0-1.8 | 40-58 | 80 |
| Polystyrene | 1.9-2.9 | 32-46 | 240 |
| Polycarbonate | 2.0-2.4 | 55-75 | 155 |
| PET | 3.5-11.0 | 60-150 | 260 |

Cross-Link Exchange in a Polyimines

In an embodiment, preparation of an imine-linked linear polymer comprises the combination of a diamine monomer and a dicarbonyl monomer of appropriate geometries. In a non-limiting aspect, preparation of a network polymer further comprises the use of a tri, tetra or multivalent amine monomer, or a tri, tetra or multivalent carbonyl monomer.

Figure 6:
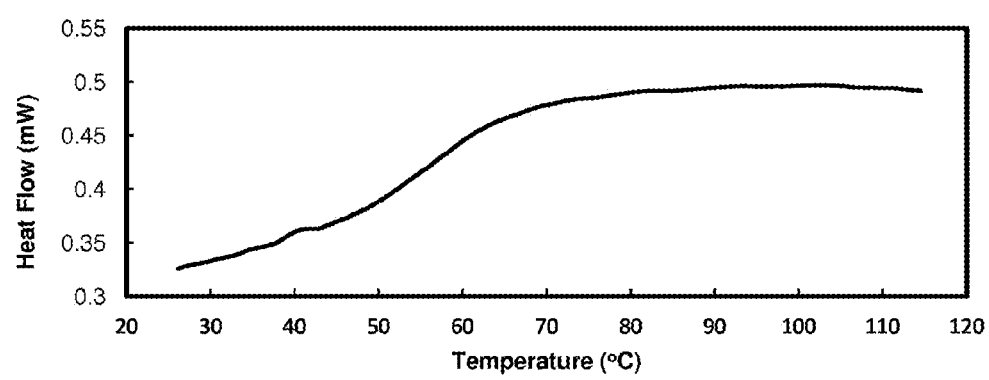
FIG. 6 depicts the results of a Differential Scanning calorimetry (DSC) experiment to determine the $T_g$ of a polyimine polymer.
Figure 7:
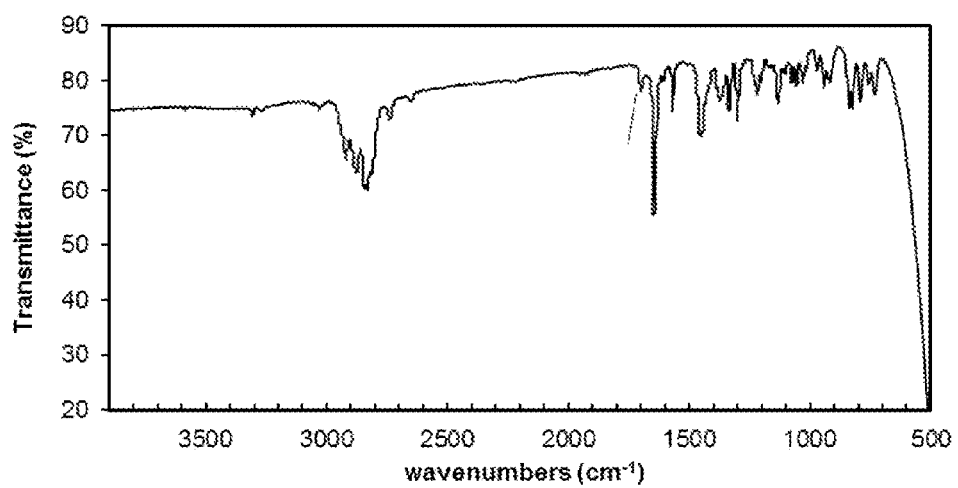
FIG. 7 depicts the infrared spectrum of polyimine in which there is a prominent C=N stretch at 1,643 cm$^{-1}$ and the C=O stretch at 1,695 cm$^{-1}$ appears as a minor peak.

Hard polymer films were prepared using terephthaldehyde as the dialdehyde monomer, and diethylenetriamine as a diamine monomer. As depicted in FIG. 1, tris(2aminoethyl)amine can be used as a triamine cross-linker. In an embodiment, the resulting polymine polymer had a yellow to orange color, was translucent, and has a measured glass transition temperature ($T_g$) of 56° C. as depicted in FIG. 6. The polymerization reaction was observed by infrared spectroscopy to consume the aldehyde end groups, which had a characteristic C=O stretch at 1,692 cm-1 while forming imine links which C=N stretch was observed at 1,644 cm$^{-1}$, see FIG. 7.

Figure 4:
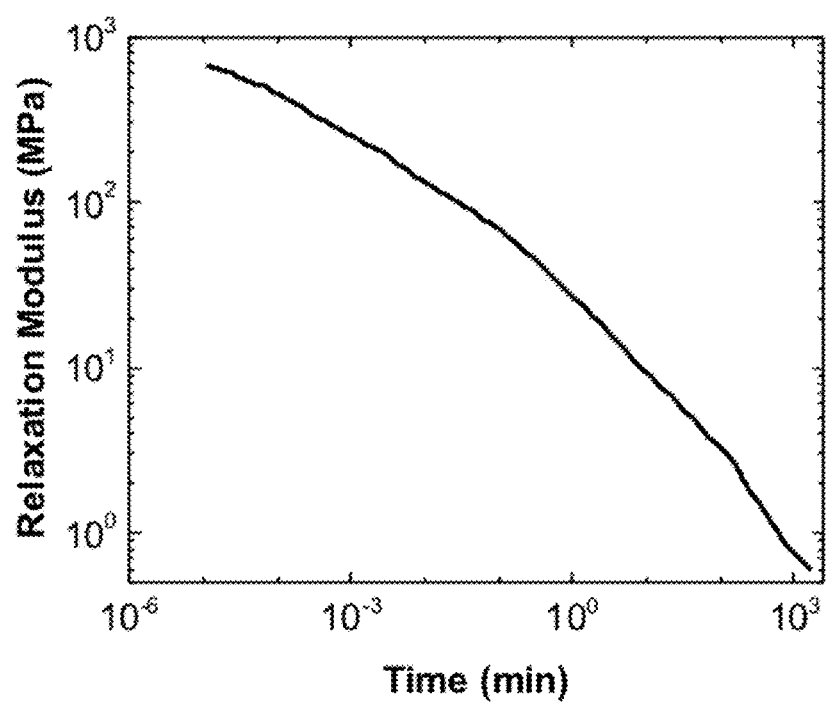
FIG. 4 depicts temperature-time superposition master curve derived from data used for creating the curves as depicted in FIG. 3

Using a stress relaxation experiment, the polyimine was found to relax stress in the solid state through reversible bond exchange reactions. The stress relaxation experiment involved applying a 1% elongation to the polymer material and then monitoring the stress required to maintain that elongation over time. If the cross-links were able to exchange, the time it took for the stress in the polymer to dissipate would be a function of the bond exchange reaction rate. As depicted in FIG. 4, the polyimine was observed to relax away nearly all stress in less than 30 min at 90° C. By performing stress relaxation testing at various temperatures, a temperature-time superposition (TTSP) plot was constructed.

Figure 3:
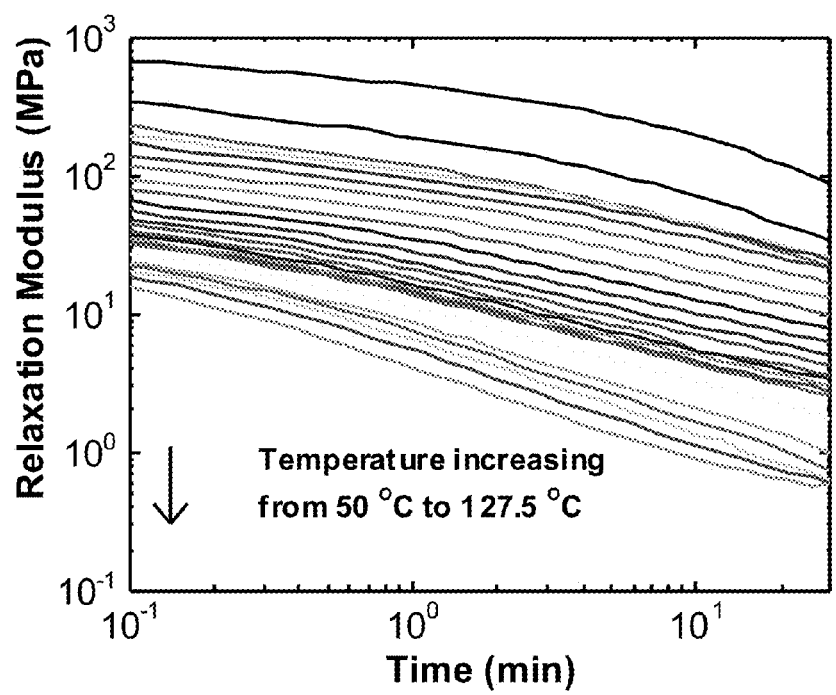
FIG. 3 depicts stress relaxation curves of a polyimine polymer at various temperatures over a time period of 30 minutes.

As depicted in FIG. 3, the polyimine's stress relaxation behavior exhibited Arrhenius-like dependence on temperature. FIG. 4 depicts the results of a 30 min stress-relaxation experiment that was performed on the same sample at several temperatures. All of the resulting curves were found to be shifted iterations of a reference, or master curve as depicted in FIG. 4.

Figure 5:
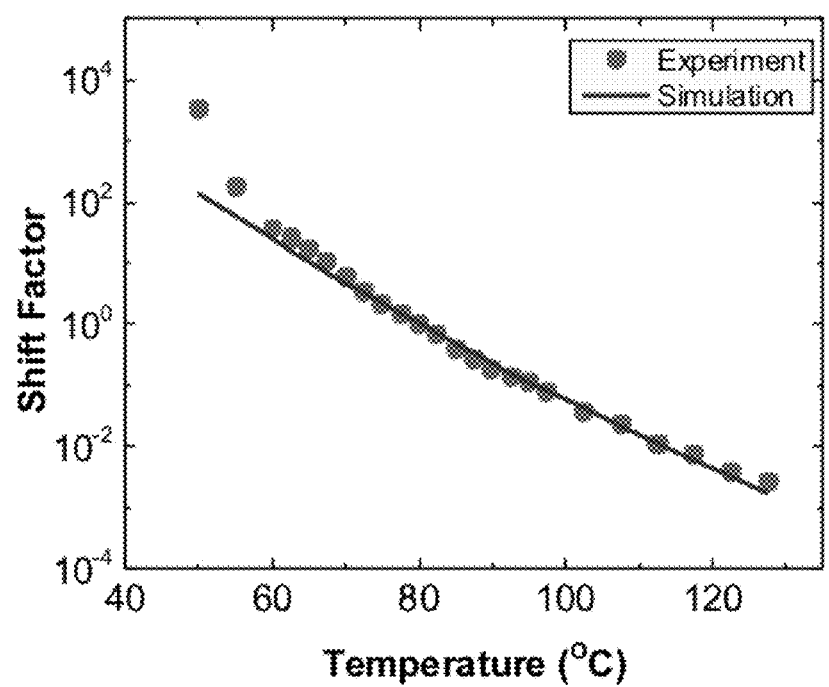
FIG. 5 depicts shift factor versus temperature plot for a temperature-time superposition experiment. The line is derived from 80° C. reference temperature data from used for creating the curves as depicted in FIG. 3

As depicted in FIG. 5, by measuring the shift factor needed for each temperature against a reference temperature, it was possible to confirm that the extrapolated (calculated) temperature-dependent rate of stress relaxation closely correlates to experimental results. Using the extrapolation, it was possible to calculate that, while it takes 30 min for 89% of the stress to be relaxed at 80° C., the same process would take about 480 days at room temperature. Without being bound by theory, this result indicates that the polyimine is expected to mimic a classic thermoset at ambient temperatures and short time scales (hours to weeks), and thus the reversible bonds would not compromise the material's utility for potential practical applications. However, unlike epoxy-acid polymers, whose transesterification reactions require a catalyst for appreciable bond-exchange at reasonable temperatures (as high as 180° C.), the imine exchange reaction was found to relax stress at easily obtainable elevated temperatures (such as those above room temperature but below about 100° C.) without the expense or complication of an added catalyst.

To verify that stress-relaxation in the bulk polymer occurs as a result of imine exchange, a small molecule model study was performed. By direct $^1$H NMR observation of the formation of a new imine species subsequent to the mixing of two parent imine molecules aa and bb as depicted in Scheme 2. The relative rate of imine exchange vs. temperature was then observed, see FIG. 9.

Scheme 2:

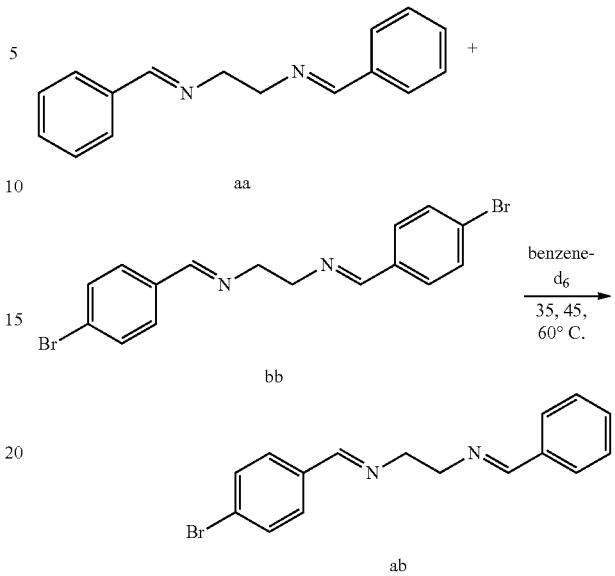

In order to directly observe the behavior of the imine exchange reaction in a non-equilibrium system, and as depicted in Scheme 2, compounds aa and bb were mixed in deuterated benzene, and the formation of ab was monitored by $^1$H NMR spectroscopy over time at three different temperatures: 35° C., 45° C., and 60° C. The sample was prepared by mixing 1:1 molar ratio of aa and bb in benzene-d6.

Figure 9:
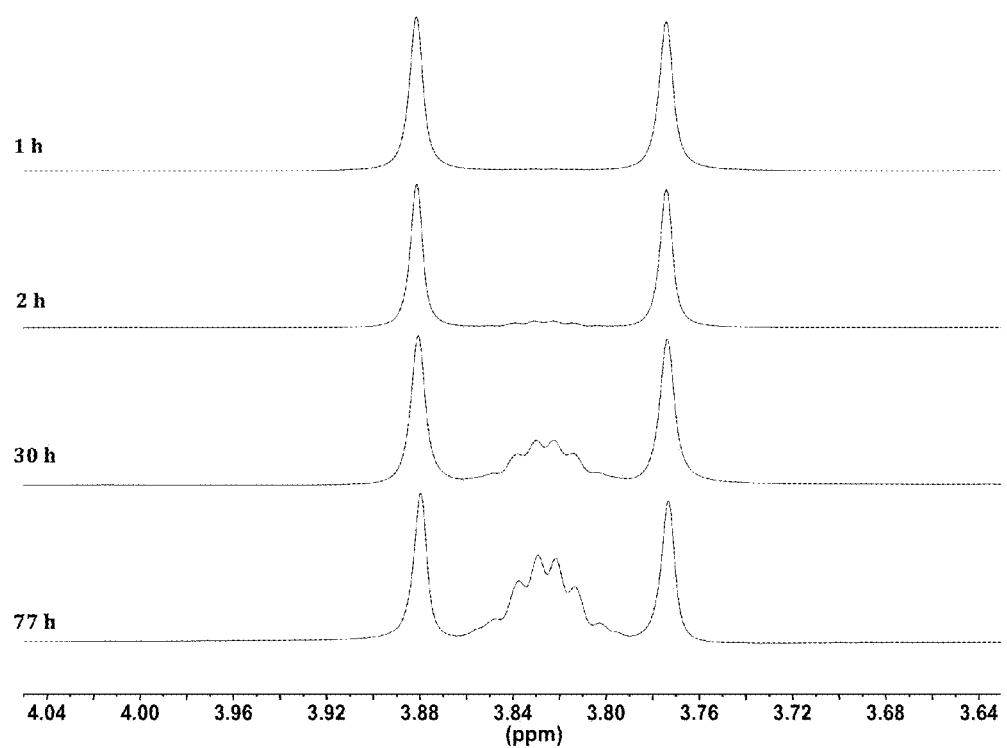
FIG. 9 depicts $^1$H NMR spectra of 35° C. sample over time and tracks the growth of the ab methylene peak from the ab compound depicted in Scheme 7.

The $^1$H NMR signal for the methylene groups in aa and bb appeared as singlets at 3.98 ppm and 3.87 ppm, respectively, in CDCl$_3$. The methylene signal of ab was a multiplet at 3.825 ppm (in C$_6$D$_6$). FIG. 9 shows the time-dependent NMR spectrum of the sample recorded at 35° C. The gradual increase of the peak at 3.825 ppm was observed, which corresponds to the methylene group of ab.

Figure 10:
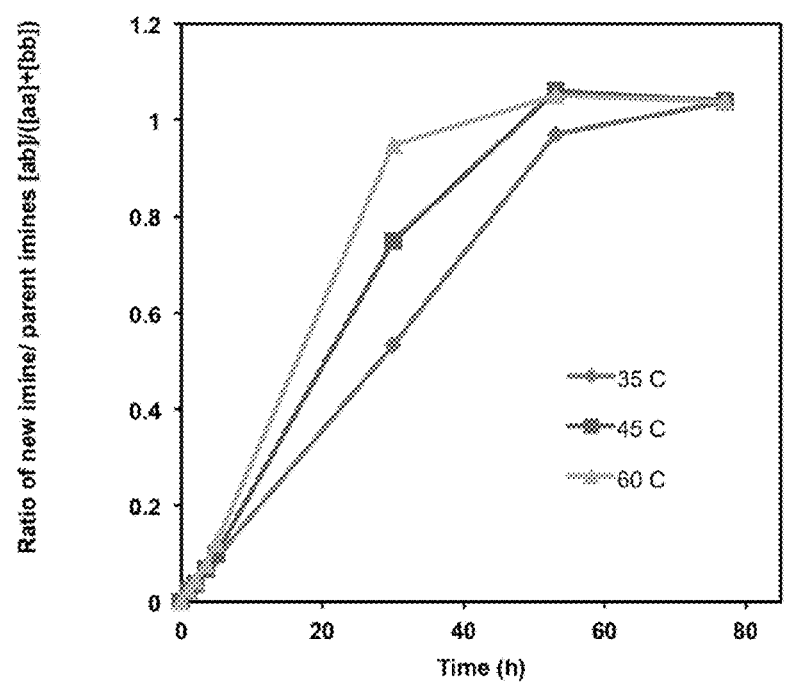
FIG. 10 is a plot of the ratio of concentrations of [ab]/([aa]+[bb]) depicted in Scheme 7 as measured by the integration of the methylene peaks of each species as depicted in FIG. 16.

FIG. 10 depicts a plot of the ratio of the integration of the methylene peaks of the new imine versus parent imines over time at various temperatures. FIG. 10 shows that the rate of the imine exchange reaction varied with temperature. The 60° C. sample reached equilibrium most quickly, and the 35° C. sample took the longest. This model study supports that the temperature-dependent rate of the imine exchange reaction is responsible for the temperature-dependent malleability of the polyimine.

The time required to reach the equilibrium concentration of the new imine can be seen as analogous to the relaxation time of a polymer under mechanical stress. Without being bound by theory, although the conditions in the bulk polymer are distinct from those of small molecules in solution, the model study shows that imine exchange reactions are a primary temperature-dependent mechanism for stress-relaxation and self-healing within the polyimine polymer.

Monomers

In an embodiment, a dicarbonyl monomer may comprise at least one aliphatic carbonyl group and/or aromatic carbonyl group. In specific embodiments, the dicarbonyl monomer useful within the disclosure comprises at least one aromatic aldehyde and/ketone group. In other specific embodiments, the dicarbonyl monomer useful within the disclosure comprises at least one aromatic aldehyde group. Examples of dicarbonyl monomers contemplated within the disclosure include, but are not limited to, dialdehydes (such as, but not limited to, glyoxal, malonaldehyde, glutaraldehyde, 2,3-thiophenedicarbaldehyde, 2,5-thiophene-dicarbaldehyde, 3-formylfurfural, 5-formylfurfural, 2,6-pyridinedicarboxaldehyde, 3,6-pyridinedicarboxaldehyde, 3,5-pyridinedicarboxaldehyde, isophthaldehyde, terephthaldehyde [such as 1,4-terephthalaldehyde (p-phthalaldehyde)], phthaldialdehyde, phenylglyoxal, and pyrroledicarboxaldehyde), and diketones (such as, but not limited to, 2,3-butanedione, 2,4-pentanedione, 4-cyclopentene-1,3-dione, 1,3-cyclopentanedione, 1,2-benzoquinone, 1,4-benzoquinone, cyclohexanedione, 3,4-dihydroxy-3-cyclobutene-1,2-dione, 1,3-indandione, ninhydrin, 1,4-naphthoquinone, 1,2-naphthoquinone, diacetylbenzene, acenaphthenequinone, anthraquinone, and benzyl). In an embodiment, a diamine monomer may comprise at least one aliphatic primary amine group and/or aromatic primary amine group. In specific embodiments, the diamine monomer comprises at least one aliphatic amine group.

Examples of diamine monomers include, but are not limited to, hydrazine, ethylenediamine, propylenediamine, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 3,3'-diamino-N-methyl-dipropylamine, phenylenediamine, phenylenedimethylenamine, diaminocyclohexane, diaminocyclopentane, diaminocyclobutane, diaminothiophene, diaminopyridine, diaminopyrrole, diaminofuran, diaminoimidazole, diaminooxazole, 3,6,9-trioxaundecan-1,11-diamine, and diethylenetriamine.

In an embodiment, a cross-linking agent is disclosed that comprises a multivalent carbonyl monomer or a multivalent amine monomer.

Examples of multivalent amine monomers contemplated within the disclosure include, but are not limited to, tris (2aminoethyl)amine, 3-ethylamino-1,5-diaminopentane, triaminobenzene, and triaminocyclohexane.

Examples of multivalent carbonyl monomers contemplated within the disclosure include, but are not limited to, multivalent aldehydes (such as, but not limited to, benzene-1,3,5-tricarboxaldehyde, 2,4,6-trihydroxy-1,3,5-benzenetricarboxaldehyde), and multivalent ketones (such as, but not limited to, hexaketocyclohexane, and 2-acetyl-1,3-cyclohexanedione).

Examples of monomers comprising at least one primary amine and at least one carbonyl group contemplated within the disclosure include, but are not limited to, aminoacetophenone, 4-ethylaminoacetophenone, 4-aminobenzaldehyde, or 4-aminomethylbenzaldehyde.

In an embodiment, polyimines disclosed herein may be prepared by contacting at least one dicarbonyl monomer, at least one diamine monomer, and at least one cross-linking agent in a system, such as a solution. These reagents may be added at the same time to the system, or may be added sequentially or in any order contemplated by those skilled in the art. In certain embodiments, the at least one dicarbonyl monomer, the at least one diamine monomer, and the at least one cross-linking agent are contacted under conditions that favor loss of water derived from the imine group formation. Non-limiting examples of those conditions include solvent removal, solvent extraction, precipitation, open air evaporation, lyophilization and the like.

In an embodiment, imine linked polymers disclosed herein comprise at least one dicarbonyl monomer, at least one diamine monomer, and at least one triamine crosslinking agent present in molar equivalents from about 1:0.99:0.0067 to about 1:0.01:0.66, respectively. In another embodiment, a tricarbonyl crosslinking agent may be used whereby the molar equivalent ratios present may be about 1:0.99:0.0067 to about 1:0.01:0.66 that correspond to ratios of diamine monomer to dicarbonyl monomer to tricarbonyl crosslinker.

In another embodiment, the crosslinking agent is a tetraamine, pentaamine or greater valency amine, in which case a more general representation may be achieved by expressing the molar equivalent ratios in terms of molecular weight/functional group such that the molecular weight is divided by the number of participating functional groups (such as the number of carbonyl groups in the monomer, or the number of primary amines present in the monomer). In such a case, the molar ratios of functional groups can be directly expressed as being present from 1:0.99:0.01 to 1:0.01:0.99 corresponding to ratios of carbonyl groups from dicarbonyl monomers to amine groups from diamine monomers to amine groups from multivalent amine monomers. In an embodiment, a crosslinking agent can be a multivalent carbonyl monomer so that the molar ratios of functional groups can be directly expressed as being present from 1:0.99:0.01 to 1:0.01:0.99 corresponding to ratios of amine groups from diamine monomers to carbonyl groups from dicarbonyl monomers to carbonyl groups from multivalent carbonyl monomers.

In another embodiment, the above-mentioned ratios may be altered such that the total number of carbonyl groups in the system is not equal to the total number of amine groups in the system. This may be done to alter the malleable properties of the resulting polyimine, or may be done to achieve some other goals, such as obtaining excess binding sites for linkers involving non-imine chemistries, or obtaining excess amines for binding of inorganic species such as nanoparticles, metal ions, for example, or other specific purpose. In another case, more than one crosslinking agent may be used, or more than one diamine or dicarbonyl monomers may be used. In such cases, the total number of primary amine functional groups may be about equal to the total number of carbonyl functional groups in the system, unless it may be desirable to incorporate an excess of carbonyl groups, or an excess of primary amine groups.

In an embodiment, a monomer comprising at least one primary amine and at least one carbonyl group is incorporated into polymers disclosed herein. In such cases, further diamine monomers, dialdehyde monomers, and crosslinking monomers may be included in the system in order to achieve various properties or results. Non-limiting examples of such difunctional monomers include aminoacetophenone, 4-ethylaminoacetophenone, 4-aminobenzaldehyde, or 4-aminomethylbenzaldehyde. In such cases, it should still be maintained that the total number of primary amine groups in the system is about equal to the total number of carbonyl groups in the system, unless for a distinct specific purpose it is desirable to incorporate an excess of carbonyl groups, or an excess of primary amine groups.

In certain embodiments, preparation of the polyimines of the disclosure further require at least one catalyst, wherein the catalyst comprises an acid, a base, an electrophile or a nucleophile. In other embodiments, the at least one catalyst catalyzes the formation of the imine groups. In another embodiment, the at least one catalyst is subsequently removed from the system once the imine groups are formed.

The kinetics of the imine-exchange reactions (especially transimination and imine formation/hydrolysis) is a major contributing factor to the thermo-mechanical properties of polyimine materials. Molecular-level affects on BER kinetics leads to tunability of the vitrimeric transition temperature ($T_v$) of the polyimine material. By altering the electrophilicity of the aldehyde, or the nucleophilicity of the amine, one can tune the thermodynamic stability as well as kinetic relaxation behavior of the resulting polyimine. Thus, in an embodiment, a small library of diamine and dialdehyde monomers could be generated to probe the relative effects of electronics and sterics upon imine exchange reactions in small molecule systems. In an embodiment, the monomers may be used to make bulk polymers.

For each of the monomers described above, a small molecule-based model compound can be prepared. Each model compound can be used in an imine exchange experiment wherein the rate of imine exchange is measured as shown below Scheme 2 which is a representative example of model studies for both a dialdehyde monomer and a diamine monomer.

Scheme 3:

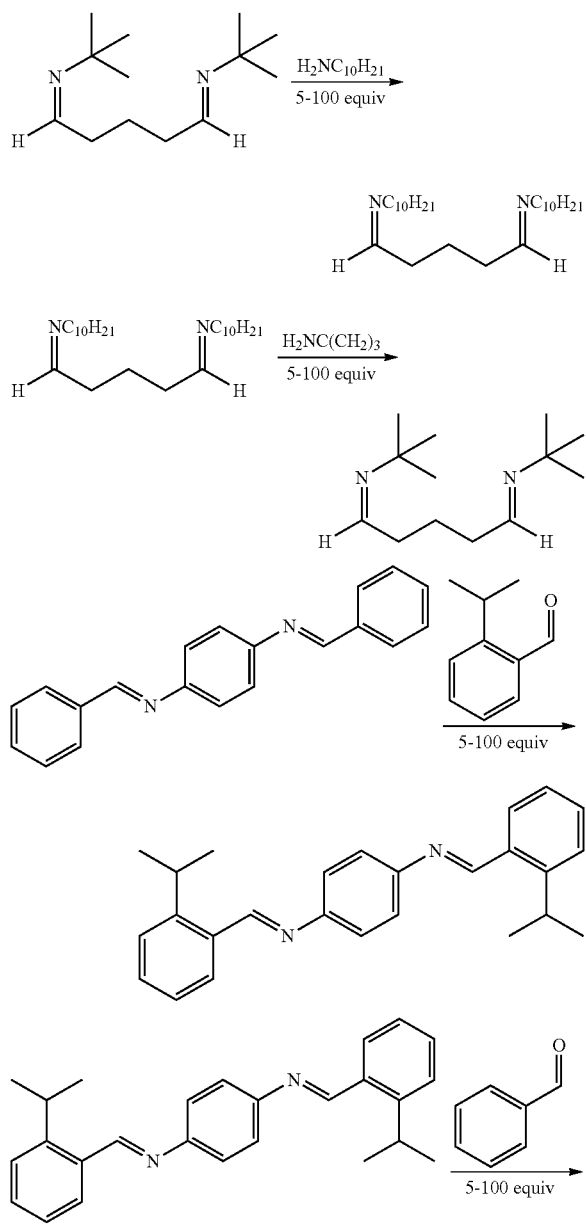

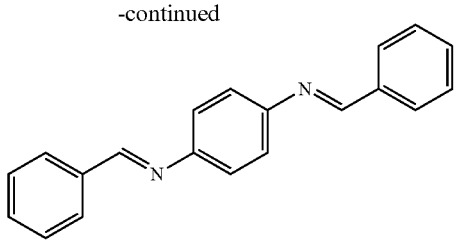

In an embodiment, monomers as depicted in FIG. 2 could be used to generate polyimines. The majority of the monomers are commercially available, though some would require a short synthesis. These monomers would be used to study the relative effects of sterics and electronics on the BER kinetics of polyimines. Nine dialdehydes can be used including aromatic dialdehydes with electron donating groups, electron withdrawing groups, and various bulky groups, as well as aliphatic dialdehydes with varying steric bulk. Similarly, ten diamines can be used including aliphatic diamines with varying steric bulk, aromatic diamines with electron withdrawing groups, electron donating groups, and a benzylic diamine. A triamine crosslinker, and a trialdehyde crosslinker can be used to prepare the network polymers.

In an embodiment, the diamine and dicarbonyl linkers can be varied separately. A polymer can be made for each of the dialdehydes and diones using 30 mol % diethylenetriamine and 70 mol % (per reactive site) tris(aminoethyl)amine as the crosslinker. Similarly, a polymer could be prepared using each of the diamines using 30 mol % terephthaldehyde and 70 mol % (per reactive site) of 1,3,5-benzenetricarboxaldehyde. Each of the polymers synthesized could be mechanically evaluated using stress-strain tests, and their BER kinetics can be measured by stress relaxation testing over a range of temperatures. The polymer molecular weight could then be determined by end group analysis using $^1$H-NMR spectroscopy. The imine condensation reaction in the polymers would also be able to be confirmed by FTIR spectroscopy.

In an embodiment, in each experiment, a di-imine will be prepared first from the monomer, and then added to the solution with a 5×-100× excess of another molecule that will undergo transimination with the monomer to form another di-imine.

The reaction will be monitored by gel permeation chromatography (GPC) and $^1$H-NMR spectroscopy. The rate can be determined by the time required for the transimination reaction to reach equilibrium. The second di-imine can also be synthesized then converted to the first di-mine by the same method, and thus the rate of the reverse reaction will also be measured. This experiment could be repeated for all of the monomers listed above. In an embodiment, all the diamine monomers can be reacted with benzaldehyde and 2-isopropylbenzaldehyde respectively, and all of the dialdehydes could be reacted with tertbutylamine and decylamine respectively.

The results of the model studies would then be compared with those of the BER kinetics measurements of the polymers. The transimintion reaction rates of the model compounds are expected to follow a similar trend as observed in the BER kinetics of the polymers.

For each of the monomers described above, a small molecule-based model compound will also be prepared, and used in an imine exchange experiment wherein the equilibrium concentrations of two different imine-linked molecules can be measured.

In an embodiment, the reaction depicted in Scheme 4 represents a pair of competing aldehydes and a pair of amines. In each experiment, either benzaldehyde could be added to a mixture of two amines, or hexylamine could be added to a solution of two aldehydes. In each case two different imines will be formed as shown in Scheme 4. The reaction solution would be heated until the equilibrium concentration is reached. This equilibrium concentration could be characterized by $^1$H-NMR spectroscopy. The reactants that would be used are the monofunctional equivalents of the compounds in the monomer library depicted in FIG. 2 and as described above.

Scheme 4:

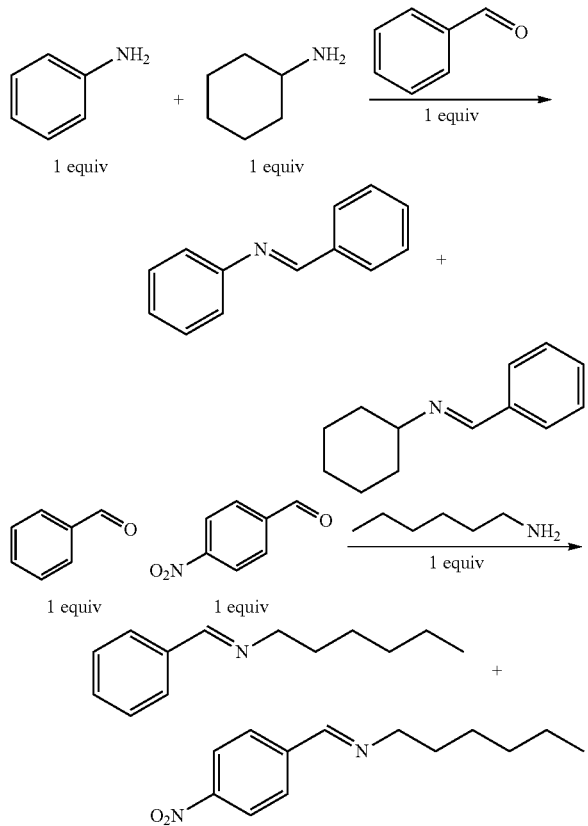

Methods of Making Polyimine Polymers

Methods of preparing polyimine polymers as disclosed herein include, but are not limited to, the following embodiments. In an embodiment, the method comprises the steps of contacting the polymer with an aqueous liquid, and converting the resulting material into dry form. In another embodiment, the method comprises the steps of heating the powdered polymer to an elevated temperature, and cooling the resulting material to room temperature. In yet another embodiment, a method of reprocessing or repurposing a polyimine polymer is disclosed.

In certain embodiments, a method for making the polyimine polymers disclosed herein comprises contacting at least one dicarbonyl monomer, at least one diamine monomer, and at least one cross-linking agent in a system, whereby the composition comprising the polyimine polymer is prepared. In other embodiments, the at least one dicarbonyl monomer, the at least one diamine monomer, and the at least one cross-linking agent are contacted approximately simultaneously in the system. In yet other embodiments, a mixture of the at least one diamine monomer and the at least one cross-linking agent is contacted with the at least one dicarbonyl monomer. In yet other embodiments, the method for making polyimine polymers further comprises removing at least a portion of the water present in the system.

DMA Stress Relaxation:

The time and temperature dependent relaxation modulus of the polyimine polymer was also tested on the DMA machine (Model Q800, TA Instruments, New Castle, Del., USA). During the test, a polymer sample with the same dimensions mentioned above was initially preloaded by $1\times10^{-3}$ N force to maintain straightness. After reaching the testing temperature, it was allowed 30 min to reach thermal equilibrium. The specimen was stretched by 1% on the DMA machine and the deformation was maintained throughout the test. The decrease of stress was recorded and the stress relaxation modulus was calculated. FIG. 3 depicts the results of relaxation tests of a polyimine polymer as disclosed herein, at 21 distinct temperatures between 50° C. and 127.5° C. on a double logarithmic plot.

Selecting 80° C. as a reference temperature ($T_r$), each modulus curve in FIG. 3 was shifted horizontally to overlap with the next. This produced the master relaxation curve shown in FIG. 4, which spans many decades of modulus (from ~676 MPa to ~0.59 MPa) and represents the actual relaxation behavior of the polymer within a long time scale (1670 min, around ~27.9 h) at 80° C. The corresponding shift factors are also plotted against temperature in FIG. 5.

The master relaxation curve of polymine polymers disclosed herein, e.g. FIG. 4, suggests that the kinetics of the BER induced stress relaxation follows the well-known temperature-time superposition (TTSP) principles. To quantitatively study the relaxation behavior, the following definition of relaxation modulus was used (Capelot, et al., 2012, ACS Macro Lett. 1:789; Montarnal, et al., 2011, Science 334:965; Capelot, et al., 2012, J. Am. Chem. Soc. 134:7664; Long, et al., 2013, Soft Matter 9:4083).

$$\tau = \frac{1}{k}\exp\left(\frac{E_a}{RT}\right) \qquad \text{Equation 1}$$

where k is a kinetic coefficient (k>0) R is the gas constant of 8.31446 l/Kmol, and Ea is the activation energy.

The shift factor, namely the ratio between the temperature dependent relaxation time and the relaxation time at a reference temperature $T_r$, is therefore expressed as:

$$\alpha = \exp\left[\frac{E_a}{R}\left(\frac{1}{T}-\frac{1}{T_r}\right)\right] \qquad \text{Equation 2}$$

The predicted shift factors of the relaxation curves are also plotted in FIG. 5 to compare with the experimental data. An Arrhenius-type dependence on temperature was revealed. By further examination of Equation 2, it was found that in the semi-log scale the energy barrier could be determined by the slope of the shift factor curve. As depicted in FIG. 3, by measuring the curve slope (18886/K), the energy barrier $E_a$ is calculated to be 157.02 kJ/mol.

Material Testing Machine for Compressing the Powder

Figure 11:
FIG. 11 depicts a schematic representation of polyimine composition cycling from a powder to being in an aluminum mold which is used to heat press the polyimine powder into solid disc by pressing the polyimine powder for 45 minutes at 80° C. under 90 kPa of pressure.

An aluminum punch mold was machined on a lathe. Since the rate of imine exchange is thermally sensitive, it is important to precisely control the sample temperature during the tests. The specially designed aluminum punch mold is shown in FIG. 11, where three hollow slots were machined in the platen to improve the thermal convective properties and temperature distribution during heating. After placing polymer powder into the mold (FIG. 11), it was then transferred into a customized thermal chamber for heating, while the applied pressure is controlled by a universal material testing machine (MTS, Model Insight 10, Eden Prairie, Minn., USA). The temperature in the thermal chamber manufactured by Thermocraft (Model LBO, Winston Salem, N.C., USA) was controlled with a Eurotherm controller (Model Euro 2404, N. Chesterfield, Va., USA) where a built-in electrical heater with a fan and an externally attached tank of liquid nitrogen provide the heat and cooling.

Recycling Study

In an embodiment, polyimine polymers disclosed herein may be recycled and reused in new applications with little to no loss in the properties of the starting, pre-recycled, polymer even after several cycles of recycling. After confirming the fundamental malleable behavior of the polyimine, the recyclability of the material was investigated. The durability of the imine-linked polymer was investigated toward complete reprocessing from powder to solid. For this purpose, the polymer powder was obtained by performing the polymerization in ethyl acetate, and collecting the precipitate. The powder was pressed in an aluminum mold under 90 kPa for 45 min at 80° C., see FIG. 11. This process resulted in the formation of a solid translucent polymer disc, see FIG. 11. The stress-strain behavior of the polymer disc is illustrated as the 'first generation' curve in FIG. 12. The disc was subsequently ground into a fine powder (FIG. 11) using sand paper, and the recycling process was repeated three times to yield the other curves in FIG. 12.

Figure 12:
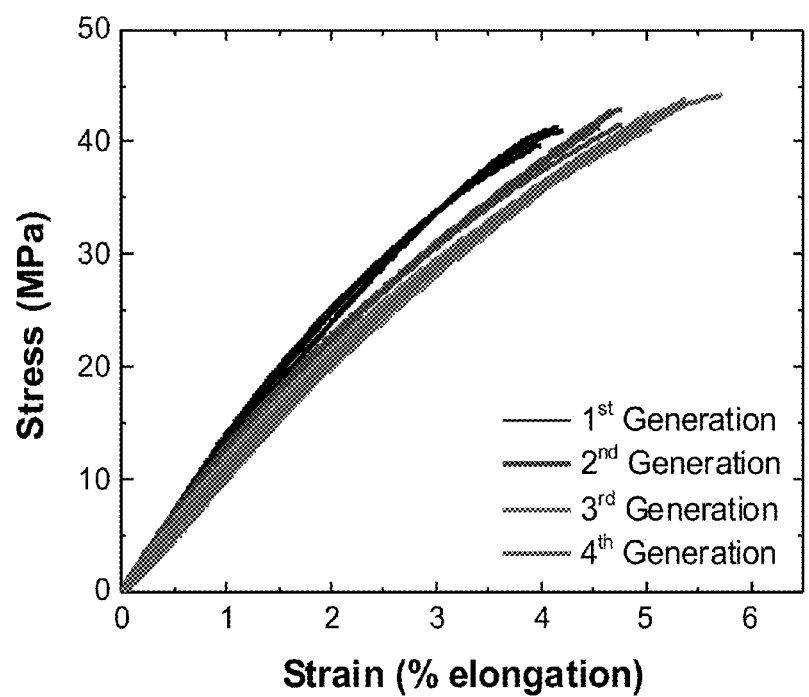
FIG. 12 depicts a stress-strain characterization four generations of subsequent polyimine discs formed from recycling the starting polyimine composition via the conditions as described in FIG. 11 as the polyimine disc is recycled through grinding into a powder and repeating the heat pressing to form a next generation of polyimine disc.

FIG. 12 shows that the polymer has excellent recyclability through four generations of recycling. There was a slight shift observed in the polymer's mechanical properties as it is reprocessed. Without being bound by theory, because the polymer's elastic modulus tended to decrease through the first few recycling generations, the polymer appeared to become less stiff and more flexible as it was recycled. Also, there was no loss in the tensile strength (stress at break) of the polymer, but rather a slight increase is observed in the 4th generation curves of FIG. 12. This behavior would be impossible for a traditional thermoset polymer, since a significant percentage of covalent bonds would be broken irreversibly upon grinding the material into a powder. In the polyimine however, the bonds are able to reform through exchange upon heating (even in the absence of a catalyst), and the polymer is observed to completely regain its original strength. Whenever a catalyst is incorporated into a polymer in order to promote reversibility, the catalyst's active lifetime will limit the polymer's reprocessability. In the case of catalyst free polyimines, there was no observed degradation of the polymer properties through four generations of recycling, indicating that the imine bond was resilient against recycling fatigue.

Mechanical Properties of Fresh Polymer Film

Figure 8:
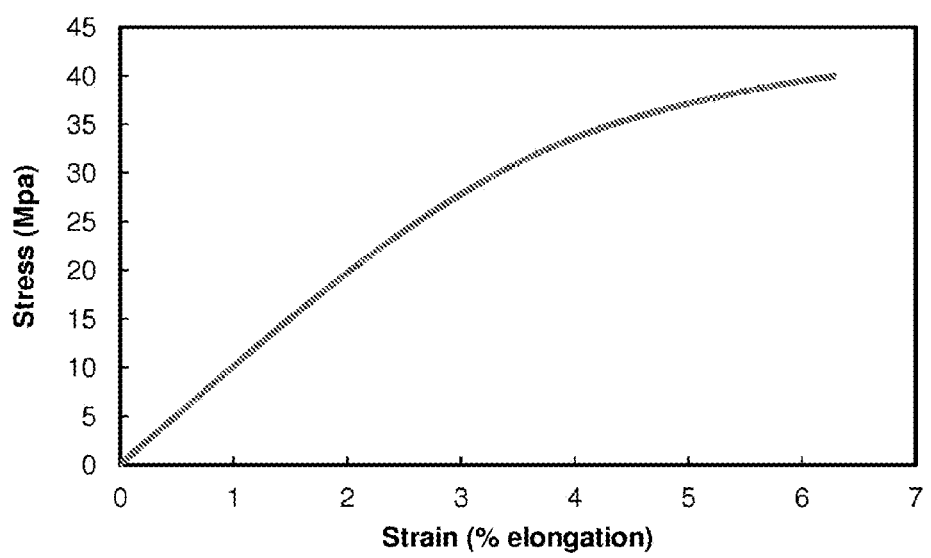
FIG. 8 depicts a stress versus strain mechanical test of an exemplary polyimine film sample.

In an embodiment, a polyimine film was made for mechanical testing by using commercially available starting materials. The glassy polymer films were prepared using terephthaldehyde as the dialdehyde, and diethylenetriamine as a diamino linker. Tris(2-aminoethyl)amine was used as a triamino crosslinker. The cross-linked polyimine undergoes a malleable phase transition at elevated temperature, and is able to relax stress in the solid state through reversible bond exchange reactions. This behavior was confirmed by stress-relaxation testing on a tensile testing instrument, the results of which are depicted in FIG. 8. The polyimine is observed to relax away 90% of its stress within 30 min at 80° C. This enables reprocessing of the material from powder to coherent solid by simply applying mild heat and pressure Inn an embodiment, and as depicted in FIG. 11, the polymer was ground to powder, and pressed into a film sequentially through four generations of recycling without any loss of tensile strength.

The freshly prepared polymer film sample was characterized by a stress strain experiment. In an embodiment, the curve in FIG. 8 represents the typical stress strain performance for the polyimine: elastic modulus ~1 GPa, stress at break ~40 MPa, elongation at break between 4 and 7%.

In another embodiment, a polyimine powder was prepared by predissolving each of the monomers in the same stoichiometric ratios in ethyl acetate, and adding the resulting solutions together in an open vessel at 85° C. in a fume hood. When the ethyl acetate was evaporated, the polymer powder was left behind.

Swelling and Drying Study

The dependence of thermo-moisture-mechanical properties of the bulk polyimine materials on the thermodynamic stability of imine linkages could be determined through swelling and drying of the polyimine polymers in various ethereal and aqueous solvents.

Without being bound by theory, if thermodynamic equilibrium is reached significantly more quickly in the presence of water, then it might mean that the chemical effect of the water is important independent of physical plasticizing effect of the polymer being swollen by uptake of water molecules.

In another embodiment, ethereal solvents such as dioxane, diethyl ether, and tetrahydrofuran could be used to swell polyimine material made from monomers used to test the rate of imine exchange in the presence of water. Weight and volume measurements could be taken to determine the extent of solvent-uptake. Additionally, stress-relaxation rates within the solvent containing polymers could be compared with the rates observed in the dry polymers, and then compared with the relaxation rate of the polymers when soaked with water.

In an embodiment, the thermodynamic stabilities of various imine bonds vs. hydrolysis of polyimine polymers disclosed herein could be determined. The impact of imine linkage thermodynamic stabilities on bulk polymer properties including mechanical properties and thermal stability would also be determined. The concentrations of di-imine molecules at thermodynamic equilibrium, resulting from competing pairs of monomers, could be measured. These results could be correlated to the measured thermal stabilities and mechanical properties of polymer materials.

In an embodiment, the sensitivity of polyimine polymers to moisture was investigated. Upon exposure to water, the hard glassy polymer became elastomeric and flexible as it swelled and reached saturation, see FIGS. 14 and 17, for example. The polymer retained its mechanical integrity even after spending several weeks immersed in tap water.

Figure 14:
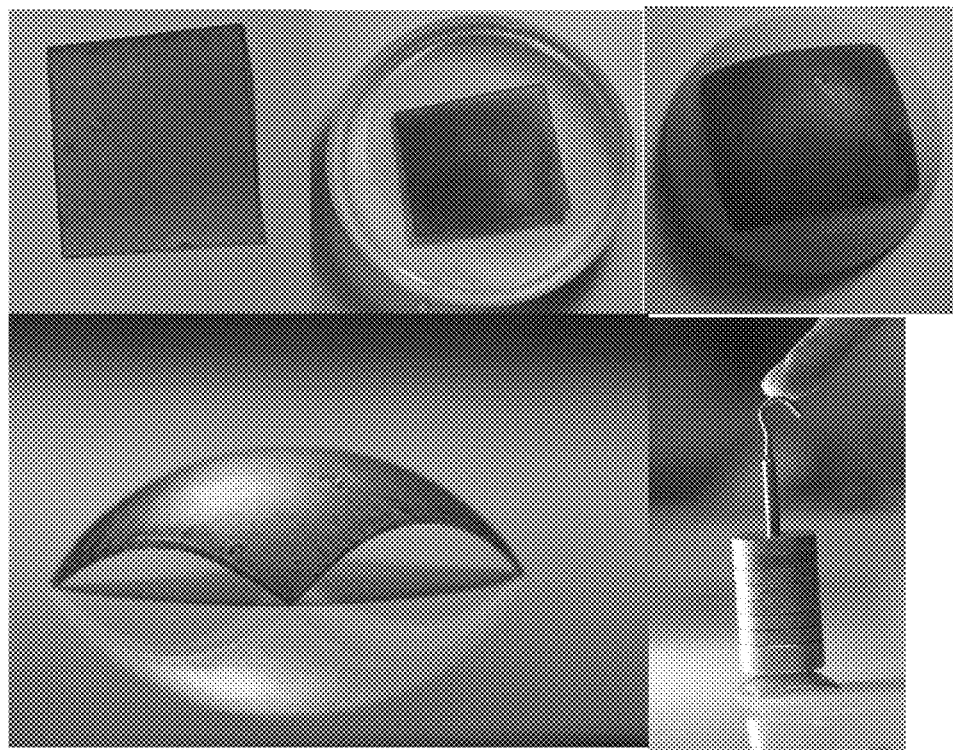
FIG. 14 depicts a solid polyimine film which was dry, hard, and glassy, then soaked in tap water for 3 hours after which the wet film sample was stretched over round mold made from ping pong ball. Following 24 hours in a plastic zip bag with drying agent, a rounded shape film sample was equally hard and glassy as the beginning dry sample was obtained. As depicted in FIG. 14, the polymer's ability to retain its new shape was demonstrated by applying a pressure in excess of 190 g without substantial deformation of the solid.
Figure 15:
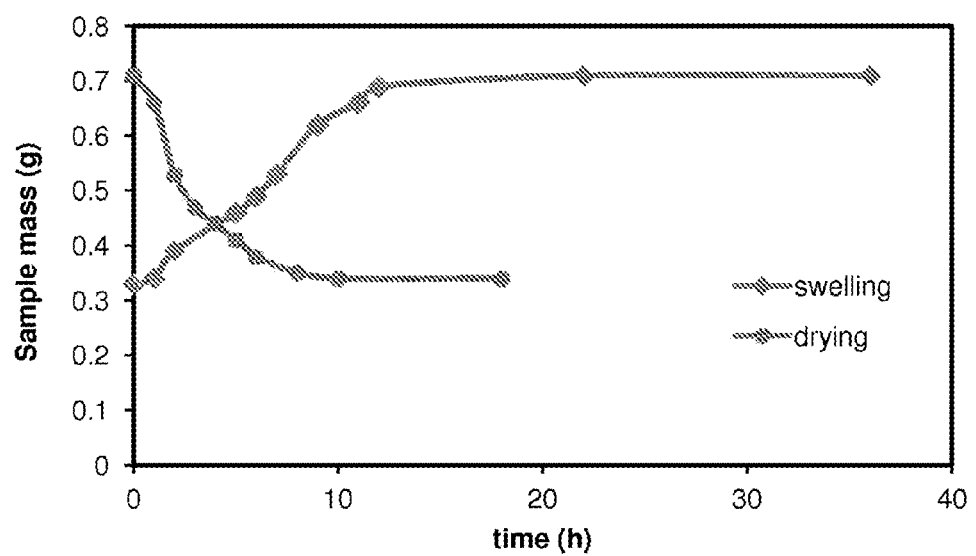
FIG. 15 depicts a change in an exemplary polyimine polymer's mass over time when immersed in water, and when removed to a dry environment.

In an embodiment, a polyimine polymer, such as that depicted in FIG. 14, was observed to absorb liquid water and swell to a saturation point. The time required to fully saturate the polymer in water was approximately equal to the time required to fully dry the sample in a plastic zip bag with drying agent for about 24 h. In an embodiment, FIG. 15 shows that the material is stable in water and the swelling stays constant beyond the saturation point.

Mechanical Response to Atmospheric Humidity

A custom-built humidity chamber using an ultrasonic humidifier with two in-line condensing chambers was used for the following measurements. The humidity level was monitored by an AcuRite 613 Indoor Humidity Monitor, which tracked the 24 hour high and low humidity readings, confirming that the humidity level was maintained at ±5% of the reported value. All of the experiments were performed at 21±1° C. at an elevation of 1,655 m above sea level. For each humidity level, the polymer film samples were kept at the designated humidity level for 24 hours, and each sample was submitted to a stress-strain test on the DMA machine immediately after removal (stress-strain experimental details elsewhere herein).

Figure 16:
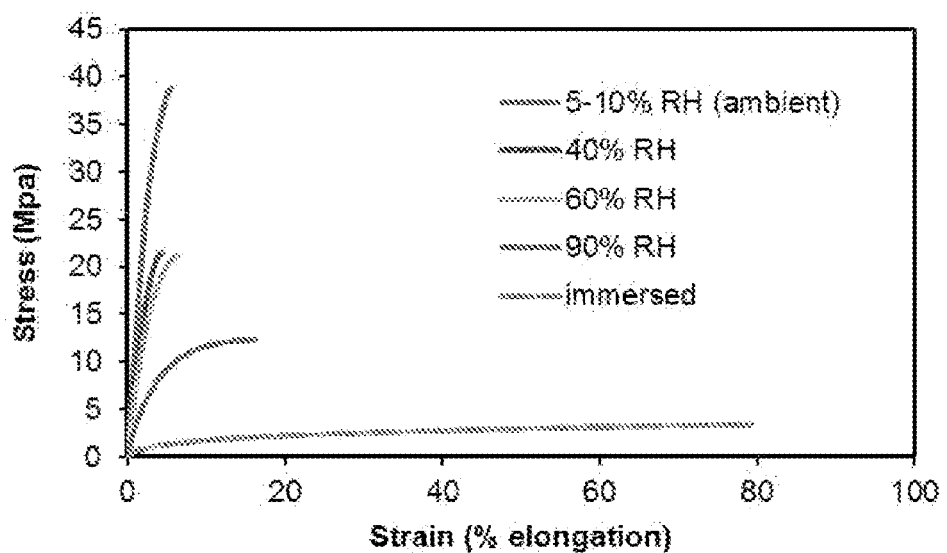
FIG. 16 depicts characteristic stress-strain behavior of an exemplary polyimine polymer at various levels of relative humidity (RH) including the stress strain curve of the polyimine polymer following 12 hours of immersion in water.

The results as depicted in FIG. 16 demonstrate an incremental softening of the material with increasing atmospheric humidity. Thus, like wood, the polyimine material became more pliable with increasing atmospheric humidity. Significantly, even at very high humidity levels, the polymer's mechanical properties are drastically different from those of the polymer saturated with water.

Water Driven Self-Healing

In an embodiment, a catalyst-free network polyimine material is disclosed that exhibits Arrhenius-like malleability in response to heat due to imine exchange reactions within the polymer. In another embodiment, a catalyst-free network polyimine material is disclosed that exhibits processability/malleability after being immersed in water. This means the polyimine polymer can be re-shaped, or fully recycled by simply processing with water and mild pressure.

Though imine bonds are notorious for their tendency to hydrolyze in the presence of water, by careful choice of monomers, a polymer that maintains its mechanical integrity after many weeks of immersion was prepared. Not being bound by theory, in polyimine polymers disclosed herein, water facilitates bond exchange and stress relaxation within the polymer at a room temperature rate equal to that obtained by heating the dry material above room temperature. Without being limited by theory, the nature of the mechanism of water-induced imine-exchange may be through primarily a plasticizing (mechanical) effect, or through a slight hydrolysis with fast exchange chemical effect. In an embodiment, the water-induced imine-exchange effect is modulated by pH. In another embodiment, the water-induced imine-exchange effect can be tuned by rational design of a polyimine that modifies the hydrolytic stability of a bulk material as well as the macromolecular details of network alteration due to BER.

In an embodiment, the BER kinetics of polyimine polymers disclosed herein may be tuned by either temperature or moisture, or a combination of both. In an additional embodiment, the two activation mechanisms of the BER active materials have multiple-activations, which can be a beneficial property in active material research. Thus, the properties of imine-linked polymers disclosed herein result in reprocessible and recyclable functional polymers under mild conditions.

Figure 13:
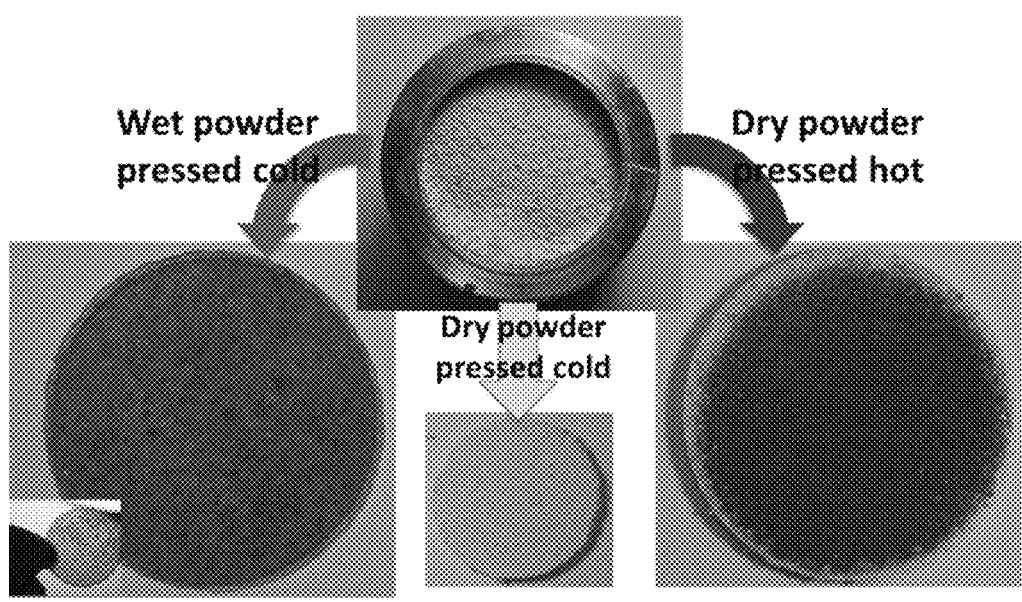
FIG. 13 depicts polyimine powder in aluminum mold and polymer discs formed by pressing wet powder under 90 kPa at room temperature for 24 hours, by heat pressing dry powder at 80° C. under 90 kPa for 40 minutes as well as forming a brittle polyimine compressed powder disc by pressing the polyimine powder under 90 kPa for 96 hours at room temperature.

In an embodiment, water caused self-healing behavior in polyimine polymer powder that was pressed for 24 hours at room temperature and 90 kPa in an aluminum mold immersed in water. As depicted in FIG. 13, at the end of pressing time, a translucent polymer disc had been formed. After drying this disc under vacuum, and then submitting it to 105° C. for 1 hour, the mechanical strength of the water-healed polymer was tested by a stress-strain experiment. Though the resulting polymer showed typical hard polymer behavior (high elastic modulus, and relatively little elongation), its performance was inferior to that observed for the discs formed from heat-pressed powder.

As a control, a batch of dry powder was also pressed in the same mold at room temperature for 96 hours. The result was a brittle disc of compacted powder as depicted in FIG. 13. There was no macro-scale evidence of bond exchange reactions in the absence of heat or water. A similar result was obtained when wet polymer powder was simply allowed to dry without pressure. Without being bound by theory, though bond exchange reactions were likely happening within each grain of powder, there was essentially no driving force to cause the grains to merge into a coherent solid.

As depicted in FIG. 14, the processability of polyimines disclosed herein was demonstrated through causing a portion of dry polymer film to be submerged in water for 3 hours. As additionally depicted in FIG. 14, the wet, newly pliable film was then stretched over a round mold, and allowed to dry in a plastic bag containing drying agent for 24 hours. As can be seen in FIG. 14, the dry polymer film was found to retain its new shape, and could even support loads in excess of 190 g without collapsing. When the object was flattened completely by very heavy loads, it immediately sprang back to its rounded shape upon removal of the load. Thus, in an embodiment, polyimine polymers as disclosed herein can be molded into essentially any shape when wet, and by drying in that new shape, a mechanically resilient hard solid is formed.

Figure 17:
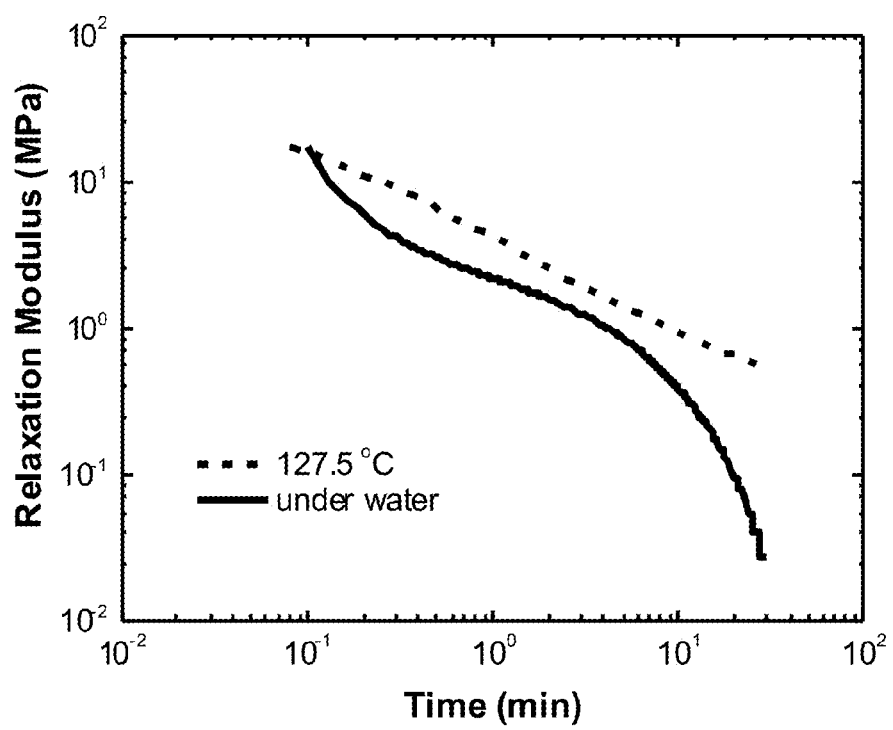
FIG. 17 depicts the relaxation modulus of a water-saturated polyimine sample. The measurement was performed under water. For a comparison, the results were plotted with the 127.5° C. stress-relaxation data from a TTSP study. The presence of water enabled more efficient relaxation than the most extreme heat condition studied.

The stress relaxation behavior of the water-saturated polymer was determined using a sample of polymer film which had been soaked in water for 24 hours, a 1% stretch stress-relaxation experiment was performed under water at 25° C. The resulting curve confirmed that the stress-relaxation behavior is comparable in water as with heating. FIG. 17 depicts the plotting of the underwater stress-relaxation experiment side-by-side with the 127.5° C. data from a time-temperature superposition (TTSP) experiment. The underwater condition was even more expedient for stress relaxation than heating the polymer to well above 100° C. Without being bound by theory, in addition to any bond exchange effect caused by the water molecules, this expedient stress relaxation could, in-part, be due to some partial hydrolysis within the network, which would allow for more freedom of movement.

Solid state $^{13}$C NMR spectroscopy was utilized to reveal the mechanism of water-driven self-healing in polymers of the present disclosure. Without being bound by theory, if there were a large degree of hydrolysis, the polymer could be significantly weakened while wet, and could be limited in its application in high humidity environments. In another aspect, if the polymer were not significantly hydrolyzed while wet, water could be facilitating the bond exchange reactions, and the mechanism could be similar to a heat-induced healing phenomenon.

Figure 18:
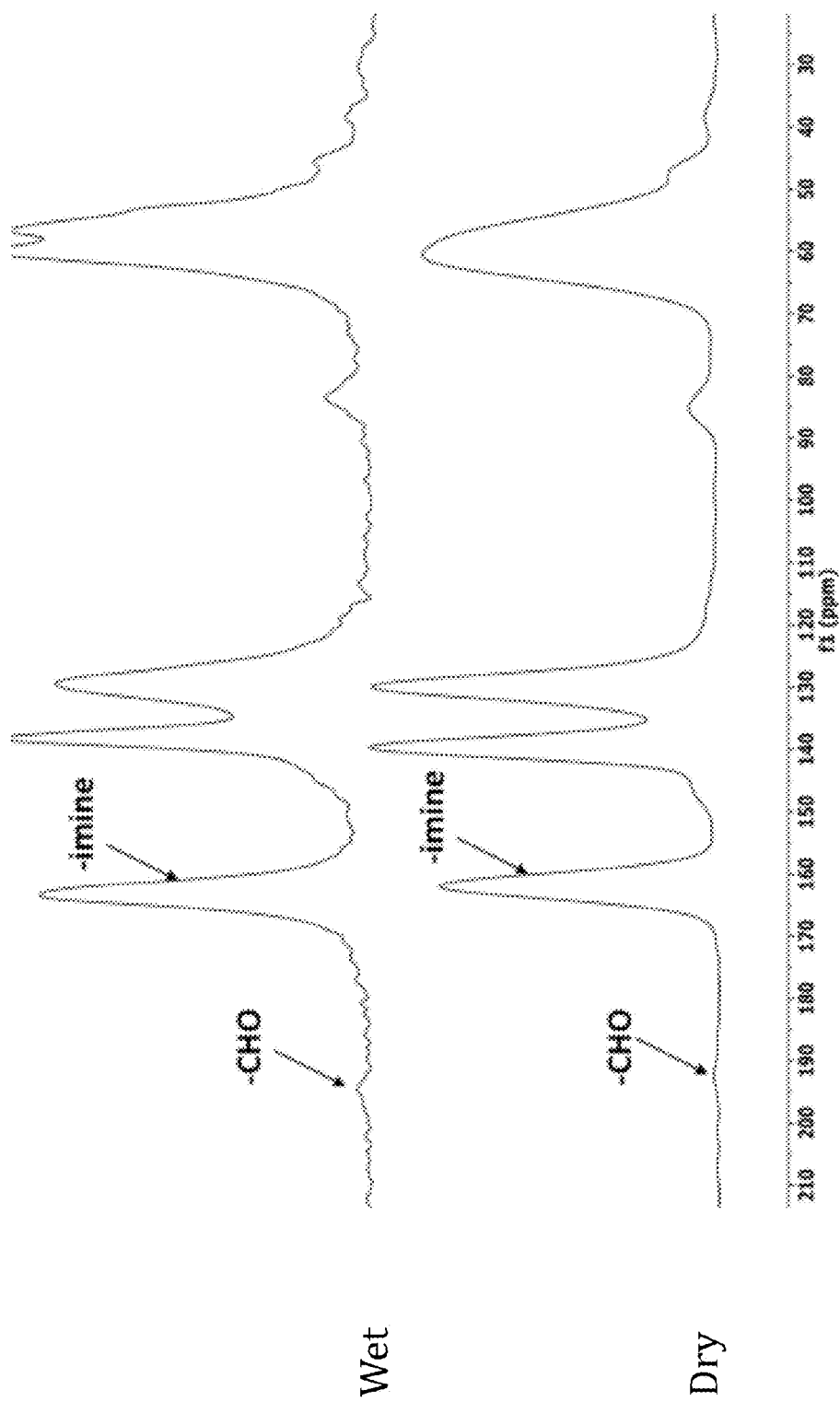
FIG. 18 depicts exemplary magic angle spinning solid state $^{13}C$ NMR of dry polyimine powder and wet polyimine powder, demonstrating structurally insignificant hydrolysis of the wet polyimine powder compared to the dry polyimine powder.

In an embodiment, hydrolysis of polyimines disclosed herein was quantified by comparing the ratios of imine bonds to aldehyde end groups in the polymer when dry to when wet. As depicted in FIG. 18, the dry polymer was found to contain an imine/aldehyde ratio of about 60/1, and the wet polymer was found to have a ratio of about 40/1. Thus, without being limited by theory, about only 1.5% of imine linkages are hydrolyzed when the polymer is immersed in water.

This means that only an insignificant number (within experimental error) of imine bonds were hydrolyzed when the polymer is immersed in water. Without being bound by theory, in addition to the small amount of hydrolysis, water may facilitate the bond exchange reactions within the polyimine polymer. This hypothesis is supported by the stress relaxation behavior of wet polymer discussed elsewhere herein. The extent of hydrolysis of the imine bonds is a matter of chemical equilibrium.

In another embodiment, the self-healing properties of polyimines could lead to solid state processing techniques for conductive polyimines. In one embodiment, this could eliminate the need for alkyl side chains which are commonly added to conductive polymers to enable solution processing.

Hydrophobicity as an "Off Switch" for Water-Induced Malleability

In certain embodiments, imine bonds derived from the reaction of aliphatic amines and aromatic aldehydes are resistant to hydrolysis. By using a very strong nucleophile (aliphatic primary amine), and a very reactive electrophile (aromatic aldehyde), the equilibrium may be shifted toward imine condensation reactions, and the relative amount of hydrolysis is minimized.

Figure 19:
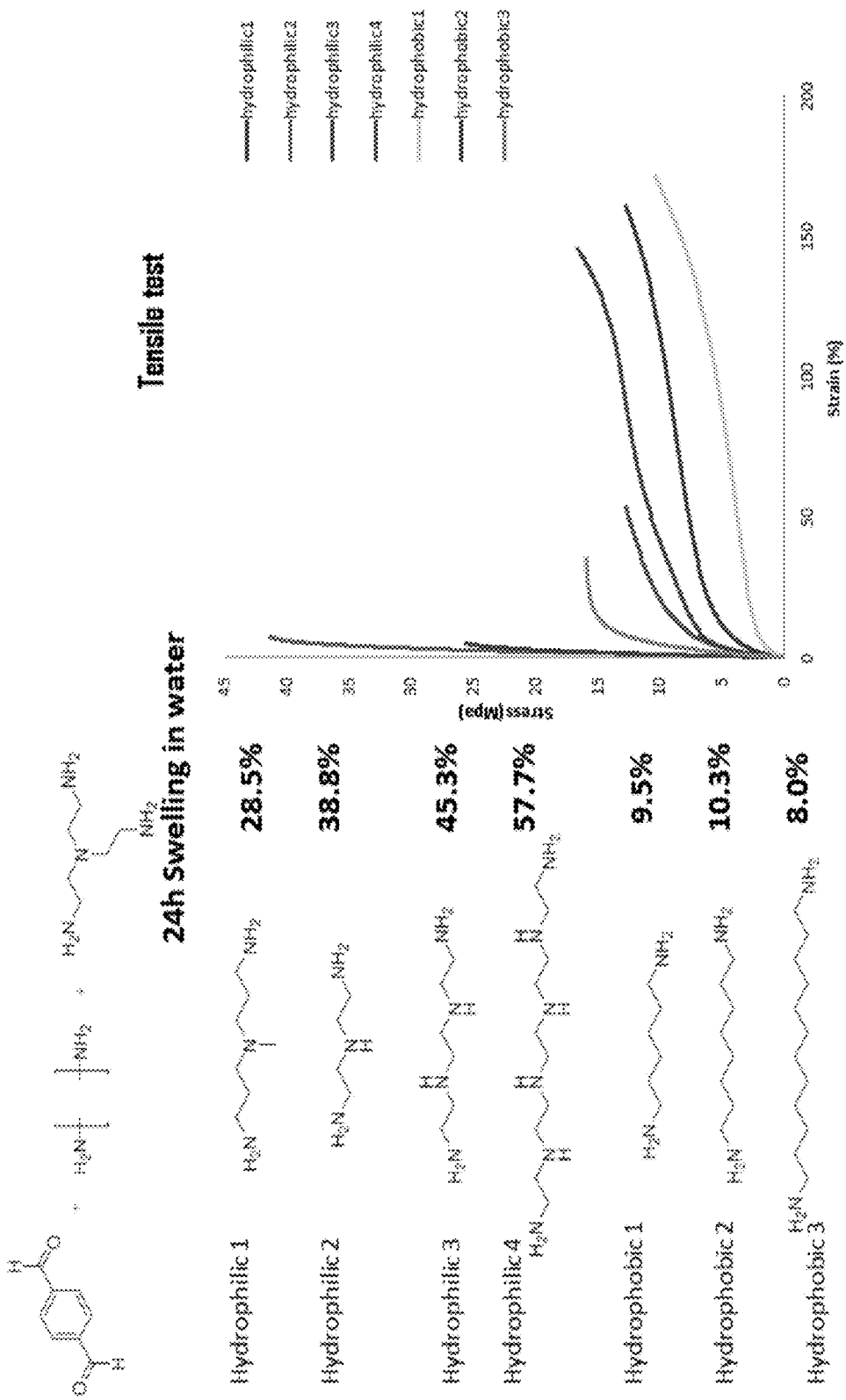
FIG. 19 depicts a series of hydrophobic and hydrophilic diamine monomer components used to make a series of respective polyimine polymers.

In an embodiment, polyimine polymers were synthesized using the dialdehyde and branching amines as generally depicted in Scheme 5 while using various diamine linkers. As depicted in FIG. 19, the first four diamine linkers increase in hydrophilicity going from 1 to 4 to make hydrophilic 1, hydrophilic 2, hydrophilic 3, and hydrophilic 4 polyimine polymers, respectively. Also depicted in FIG. 19, the last three diamine linkers increase in hydrophobicity going from hydrophobic 1, hydrophobic 2, and hydrophobic 3 and the resulting polyimine polymers, respectively.

Scheme 5:

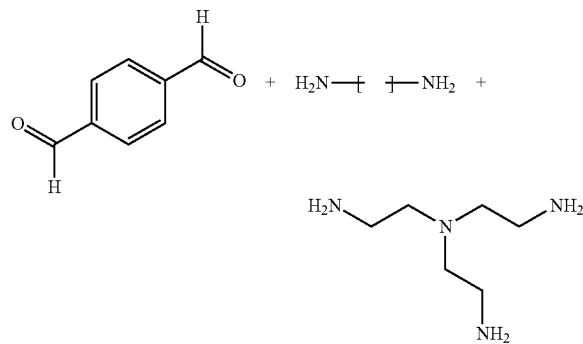

The percent swelling in water of each of hydrophilic 1-4 and hydrophobic 1-3 polymers after soaking for 24 hours is also depicted in FIG. 19. Without being bound by theory, the percent swelling roughly correlates with the hydrophilicity of the diamine linkers used to make the polyimine polymers as tested.

Figure 20:
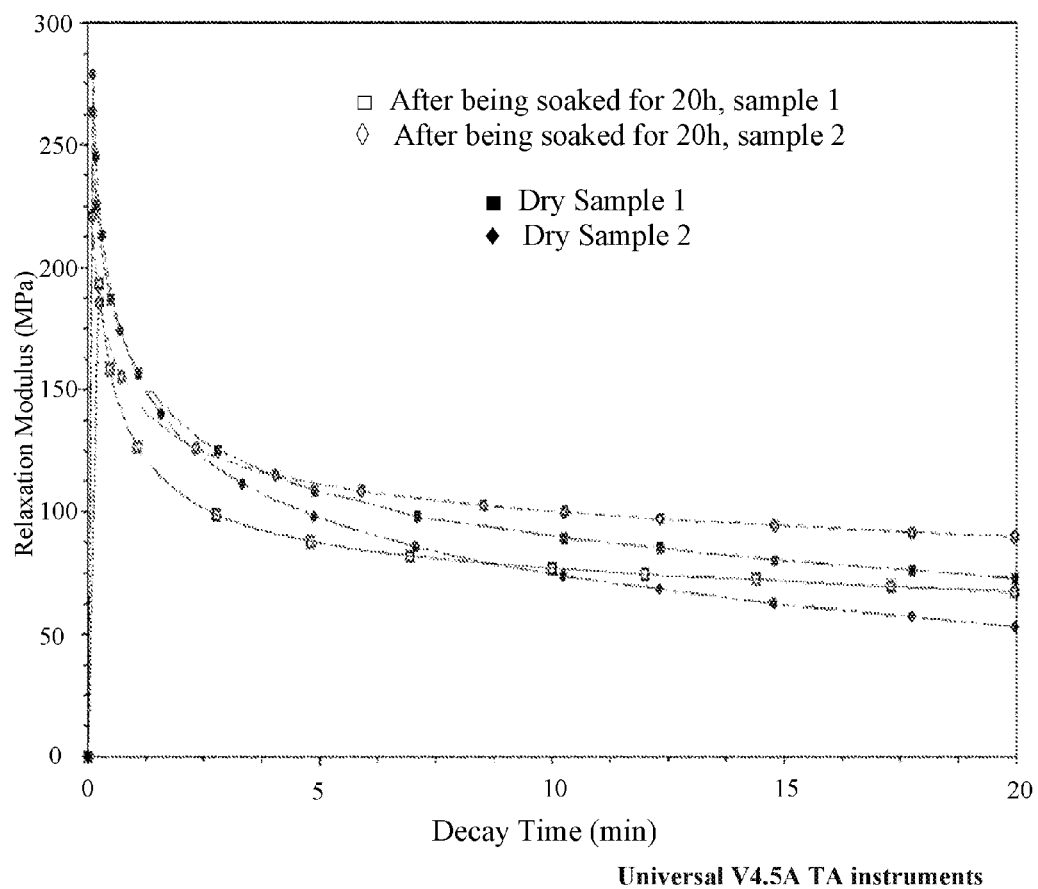
FIG. 20 depicts the relaxation modulus characteristics of a polyimine polymer that incorporates a hydrophobic diamine monomeric under dry conditions and after being soaked in water for 20 hours.

FIG. 20 depicts the stress-relaxation curves of a hydrophobic polyimine in the dry state side-by-side with a sample which had been immersed in water for 48 hours. Thus, FIG. 20 depicts a hydrophobic polyimine material which exhibits no significant response to the presence of water, it does not show significant change in its thermomechanical properties.

In an additional embodiment, applying a hydrophobic coating to a hydrophilic polyimine can provide an effective moisture barrier, resulting in environmental moisture having little to no effect on the thermomechanical behavior of a polyimine polymer.

In an embodiment, hydrophobic polyimines can be formed by using monomers with a minimum concentration of nitrogen atoms and long alkyl chains. Without being bound by theory, this may minimize the equilibrium concentration of water within the polymer matrix, and at lower concentrations there is less opportunity for water to facilitate the transamination reaction which may be a mechanism for stress-relaxation within the polyimine matrix.

Applications

In an embodiment, polyimine polymers disclosed herein are useful as, but not limited to surface coatings, self-healing layers and as adhesives.

In an embodiment, a surface coating application of the polyimine polymers disclosed herein is a hydrophobic polyimine. Hydrophobic polyimines represent optimal moisture barrier coatings for hydrophilic polyimines with similar mechanical properties. This is because the coating is able to exchange crosslinks with the substrate through the transamination reaction. In another embodiment, hydrophobic polyimines can be used as an anti-fouling coating for metals due to the known anti-fouling character of the imine bond, combined with a robust cross-linked covalent network.

In an embodiment, polyimines made by using a diamine monomer such as hydrophobic 1 as depicted in FIG. 19, have $T_g$ below room temperature and also exhibit self-healing behavior at room temperature. In an embodiment, when two freshly broken surfaces of polyimines are brought together with pressure, the surfaces weld together automatically. Longer time in contact results in greater concentration of crosslinks restored at the interface. Eventually the material regains close to its original strength.

In another embodiment, adhesive polyimine polymers are disclosed that through dative bonds, dipolar interactions, and hydrogen bonding, the polyimines stick tenaciously to inorganic surfaces such as metals, glasses, and ceramics. Glassy polyimine powders can be welded to such surfaces with heat and pressure, and represent a novel crosslinked dry adhesive powder. Elastomeric polyimines, such as those made from hydrophilic 1 depicted in FIG. 3, can be welded to surfaces at room temperature when sufficient pressure is applied. Freshly cut, or freshly broken polyimine surfaces work best for adhesion to the surfaces of glasses, metals and ceramics. Thus, polyimines disclosed herein are solid-state, self-healing adhesives which are volatile organic carbons (VOC) free.

In an embodiment, polyimine polymers disclosed herein may be processed by various techniques. Without being limited by theory, because of the polyimine's ability to exchange crosslinks, processing techniques which are usually applicable only to thermoplastics may be used on the polyimines disclosed herein. These processing techniques include, but are not limited to, blow molding, powder metallurgy plus sintering, compression molding, extrusion molding, injection molding, laminating, reaction injection molding, matrix molding, rotational molding, spin casting, transfer molding, thermoforming and vacuum forming.

Crosslinking Effects of Transition Metal Additives on Polyimine Networks

Without being bound by theory, some metal additives can serve two competing roles in a polyimine polymer by acting both as a catalyst which lowers the activation energy of the transamination reaction, and as a cross-linker as dative bonds can form between the metal center and multiple nitrogen atoms in the polymer matrix in a polyimine matrix. In an embodiment, Scandium$^{III}$ triflate can act both as a catalyst and as a cross-linker in polyimines disclosed herein. At sufficient concentrations, the cross-linking effect can cause an increase in the glass transition temperature ($T_g$) of the polyimine, which can result in an increase in the malleable temperature, also referred to as the vitrimeric transition or $T_v$. At low concentrations, the catalytic behavior is dominant, and results in a decrease in the $T_v$ of the polymer.

Figure 21:
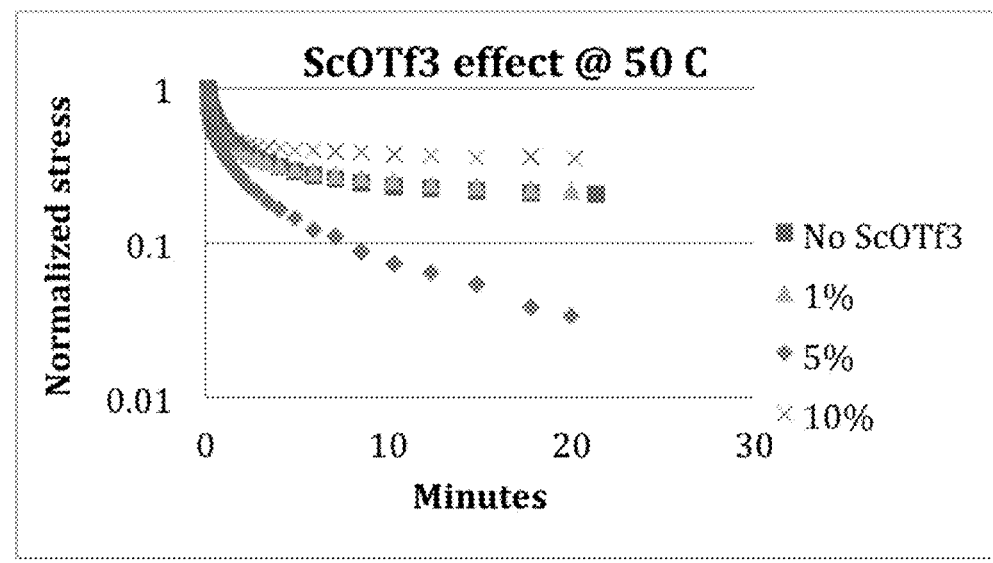
FIG. 21 depicts stress measurements of a series of polyimine polymers containing increasing levels of Scandium triflate.

As depicted in FIG. 21, while 1% Scandium doping had no observed effect on the relaxation of the polyimine at 50° C., 5% doping resulting in a dramatic increase in relaxation rate at 50° C. (corresponding to a dramatic decrease in $T_v$). As depicted in FIG. 21, 10% doping led to a decrease in relaxation rate (increase in $T_v$), and is most likely due to dative bond crosslinking which could restrict thermal motion within the matrix, increasing both the $T_g$ and $T_v$. While the catalytic effect of Lewis acids on the transamination reaction is well known, the cross-linking effect was not expected.

Without being bound by theory, given the nature of imine and amine nitrogens, and their high concentration within a polyimine matrix, one would suppose that metal centers with open coordination sites could act as a crosslinker, and could be used to tune the $T_g$ and $T_v$ of the material.

Figure 22:
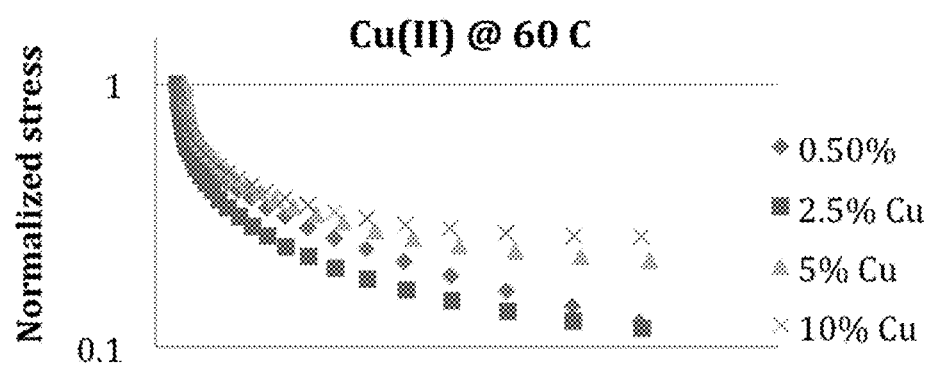
FIG. 22 depicts stress measurements of a series of polyimine polymers containing increasing levels of Copper chloride.

In an embodiment, as depicted in FIG. 22, a polyimine with $Cu^{II}$ chloride added in various percentages exhibits a crosslinking effect while at the same time having negligible catalytic activity. As depicted in FIG. 22, the addition of 5% of a $Cu^{II}$ additive can result in a significant decrease in relaxation at 60° C., corresponding to an increase in $T_v$.

In an embodiment, the moldable transition temperature for polyimines can be tuned by either monomer choice or introduction of inorganic additives. Without being bound by theory, both approaches can be used in the process of designing a polyimine polymer formulation with desired thermal and mechanical properties.

In an embodiment, polyimines incorporating metal additives as disclosed herein exhibit a malleable temperature ranging from about 100° C. to 180° C.

Composites

In an embodiment, network polyimines may be used as the binder/resin for advanced composite materials such as carbon fiber, fiberglass, kevlar, ultra-high molecular weight polyethylene (UHMWPE), carbon nanotubes, and common and uncommon fibrous composites. Such polyimine composites are thermomoldable, repairable and completely recyclable. In an embodiment, multilayer composite materials may be prepared by simple heat-pressing, with no wet chemical process necessary for preparing multilayered composites of any shape starting from, for example, flat sheets of polyimine film, and for example, flat sheets of (woven or non-woven) fiber and polyimine.

Single Layer Composites

Figure 23:
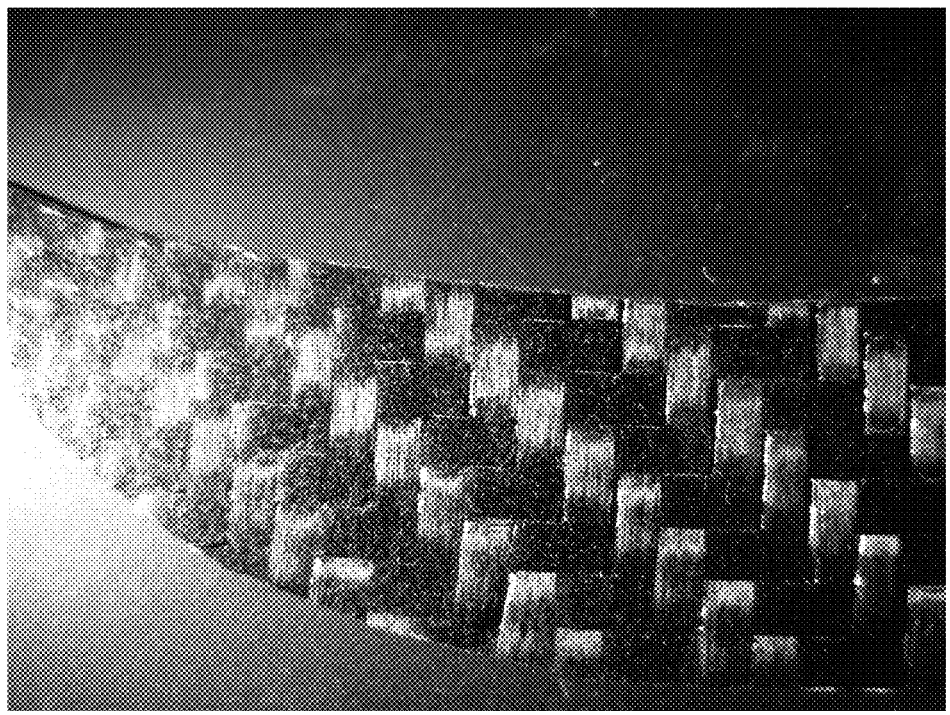
FIG. 23 depicts an image of a flat stock sheet of a carbon fiber composite impregnated with a "hydrophilic 2" polyimine resin.

In an embodiment, 1-ply composite materials can be prepared from, for example, twill-weave carbon fiber fabric and a glassy polyimine such as hydrophilic 2 as disclosed in FIG. 23. In an embodiment, these materials can be prepared in ratios ranging from 50:50 fiber:resin by weight to 70:30 fiber:resin by weight. In another embodiment, these materials can be prepared in ratios ranging from 30:70 fiber:resin by weight to 70:30 fiber:resin by weight. In yet another embodiment, these materials can be prepared in ratios ranging from 10:90 fiber:resin by weight to 90:10 fiber:resin by weight. In an embodiment any ratio ranging between about 1 percent to about 99 percent fiber to about 1 percent to about 99 percent resin may be used depending upon the desired properties of the composite material. In an embodiment, polyimine composite materials can be prepared by a wet chemical process involving evaporation of some carrier solvent from a container containing dissolved aldehyde and amine containing monomers and also containing woven or non-woven fibers, with subsequent heat treatment to drive water from the matrix and bring the polymerization to completion. In an embodiment, ethanol may be used as a carrier solvent. In another embodiment, polyimine composite materials may be prepared via roll-to-roll processing incorporating, for example, extrusion of polyimine film, compression molding or hot calendaring of polyimine films, powders, beads, or gels. FIG. 23 is an image that depicts a 1-ply polyimine composite material made by using methods and polyimine polymers disclosed herein.

In another embodiment, diamine monomers may be used to dissolve portions of a polyimine resin to repair a damaged area of a composite device.

Thermoforming 1-Ply Composites

Figure 24:
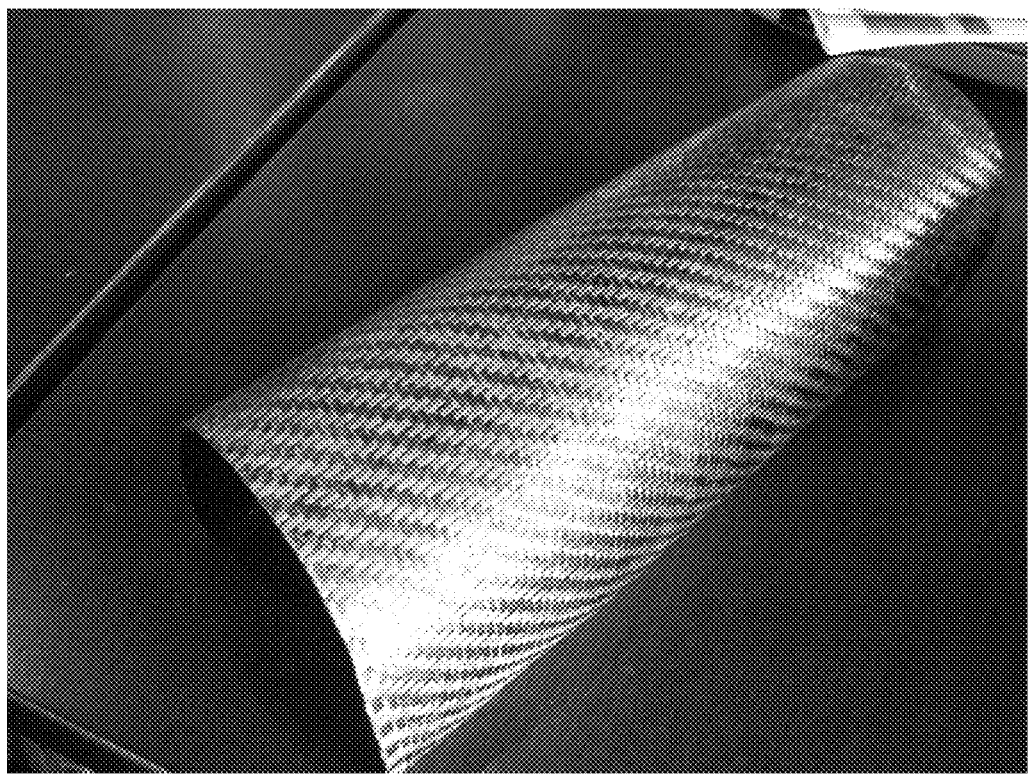
FIG. 24 depicts an image of a twill-weave carbon fiber composite material containing a "hydrophilic 2" polyimine resin. The composite is about 50:50 by weight fiber to resin. The rounded shape was thermoformed from a flat sheet.

Without being limited by theory, due to novel bond-exchange reactions within the polyimine matrix, and the resulting malleability of the covalent network polyimine, the 1-ply composites disclosed herein are thermoformable when heated above the $T_v$ of the polyimine polymer resin. Thus, the material can be thermoformed repeatedly into any number of different shapes. It need only be reheated, reshaped, and held in new shape until cooled. FIG. 24 is an image that depicts a 1-ply composite which was originally a flat sheet, but was thermomolded into a curved shape.

Multi-Layer Composites

In an embodiment, multiple 1-ply composite sheets may be combined into a single device by use of polyimine films as a dry adhesive layer in-between plies of composite. For example, a film of polyimine polymer hydrophilic 1, as depicted in FIG. 23, that has a thickness between 10 µm and 5 mm may be used as an adhesive layer and a two ply composite device may be prepared by heat pressing two 1-ply polyimine composites with a sheet of dry adhesive in-between. In one embodiment, heat and pressure may be applied to allow malleability and flow of the adhesive layer to form intimate bonding to the surfaces of both plies. In another embodiment, heat and pressure may be applied to allow malleability of the resin in the composite as well as the polyimine adhesive to promote inter-crosslinking of the adhesive with the composite on either side.

In another embodiment, multilayer devices of more than two plies may be prepared by adding one additional layer of adhesive, and one additional layer of 1-ply composite for each additional layer desired. In another embodiment, an adhesive sheet may be combined with 1-ply composite, and some substrate which requires protection, such as a layer composed of a glass, metal, ceramic, polymer, or other composite. In an embodiment, additional and subsequent layers are added in the same manner.

Composite Materials with 3D Curvature

Figure 25:
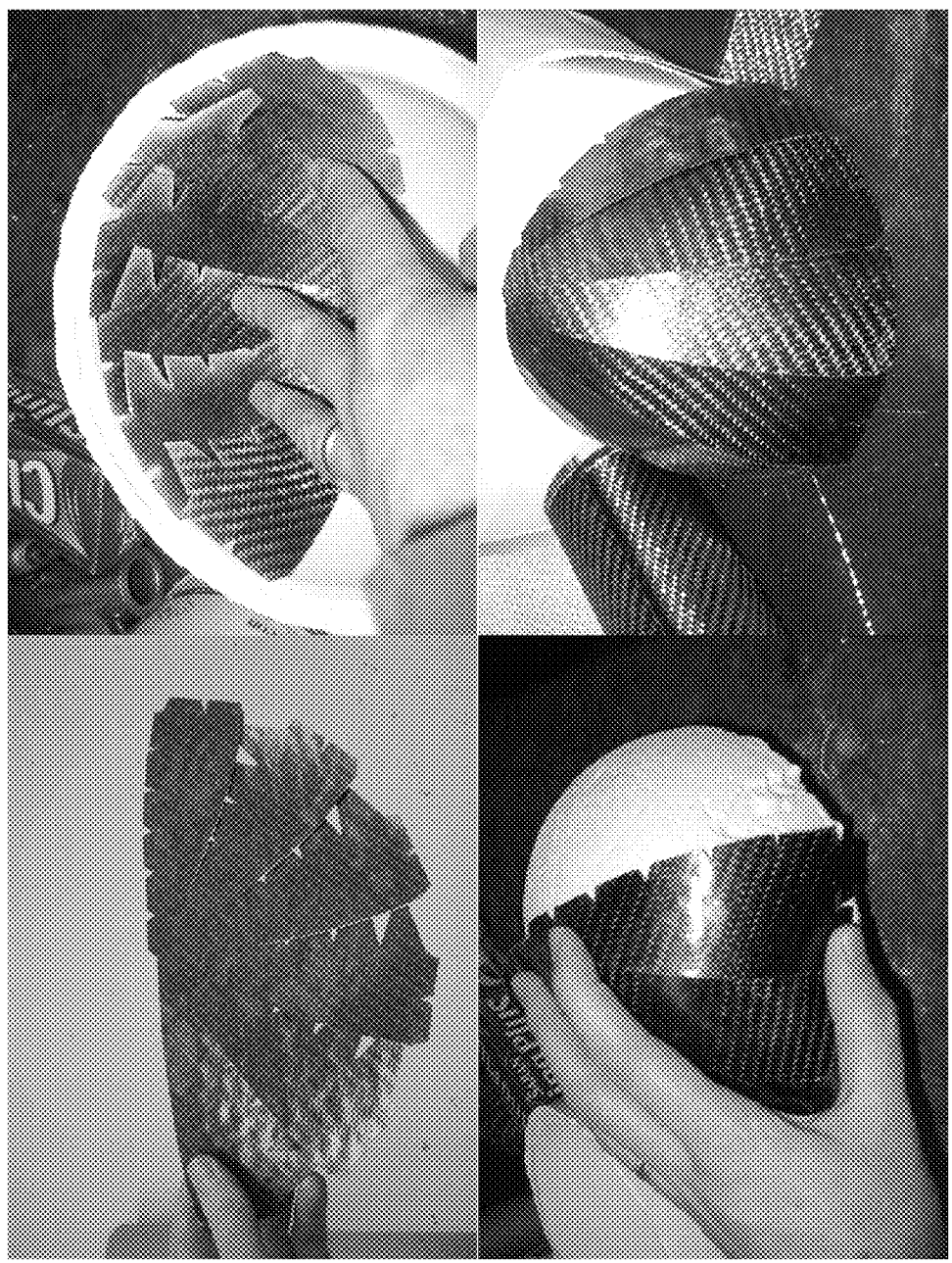
FIG. 25 depicts a representation of a method to make a 3D structure from a flat 1-ply sheet of composite material that contains a polyimine resin, by making slits and bonded overlaps into the flat 1-ply composite sheet and then thermomolding into the 3D structure.

Since fibers used in advanced composites are flexible, but not stretchable, it is typically impossible to form three dimensional curvature from pre-formed flat composite sheets. Typically, a wet lay-up process of the resin is done after the woven or non-woven fibers are layed into a 3D shape or mold. However, in an embodiment, a flat sheet of 1-ply polyimine composite may be formed into any 3D shape by cutting slits in the material in strategic locations, and by removing certain areas or cutting out a pattern. In an embodiment, the cut and modified flat sheet may subsequently be thermoformed into any 3D shape, including curved shapes, such that there is an overlaping region in the final 3D shape. Thus, in an embodiment, 3D shaped polyimine composites can be created that do not contain any overlapping regions that might crosslink exchange between the resin of the surface portion, and the resin of the overlapping portion. In an embodiment, 3D shaped polyimine composites can be created that allow for crosslinks between the surface portion and an overlapping portion, and may be exchanged with an adhesive layer composed of a section of adhesive polyimine film. When properly crosslinked, the overlapping regions significantly strengthen and improve the structural integrity of the resulting thermoformed shape. In an embodiment, a flat rectangular 1-ply polyimine composite may be thermomolded into a rounded shape by thermomolding after strategic slits are cut in the material, as depicted in FIG. 25.

In another embodiment, multilayer 3D polyimine composites may be formed by thermomolding layer-by-layer by using the same approach described above, and finally heat pressing all of the thermo-formed layers together to create a final multilayered polyimine composite form.

Recycling of Composites

In an embodiment, polyimine composites can be recycled in an efficient closed-loop process where all products of the recycling process can be reused for their original purpose with no observed loss in performance of subsequently generated polyimine composites. In an embodiment, a hydrophilic 2 polyimine, as depicted in FIG. 19, was used as the resin, then diethylene triamine (DETA) liquid was used to depolymerize the polyimine, leaving clean, unharmed carbon fiber fabric behind. The mechanism of the depolymerization is competitive transamination of the DETA solvent with the primary amine moieties within the polymer network that results in introduction of end groups, a decrease of molecular weight and solubilization of polyimine oligomers. Thus, the depolymerization mechanism is identical to the transamination reaction which enables the malleability of the polyimine network. In an embodiment, the DETA polyimine solution may directly be used to form more hydrophilic 2 polyimine by simply formulating in terephthaldehyde and tris(2-aminoethyl)amine necessary to achieve the desired stoichiometric balance of the resulting polyimine. The DETA polyimine solution may be used to form another 1-ply composite with fresh or recycled fiber material.

Figure 26:
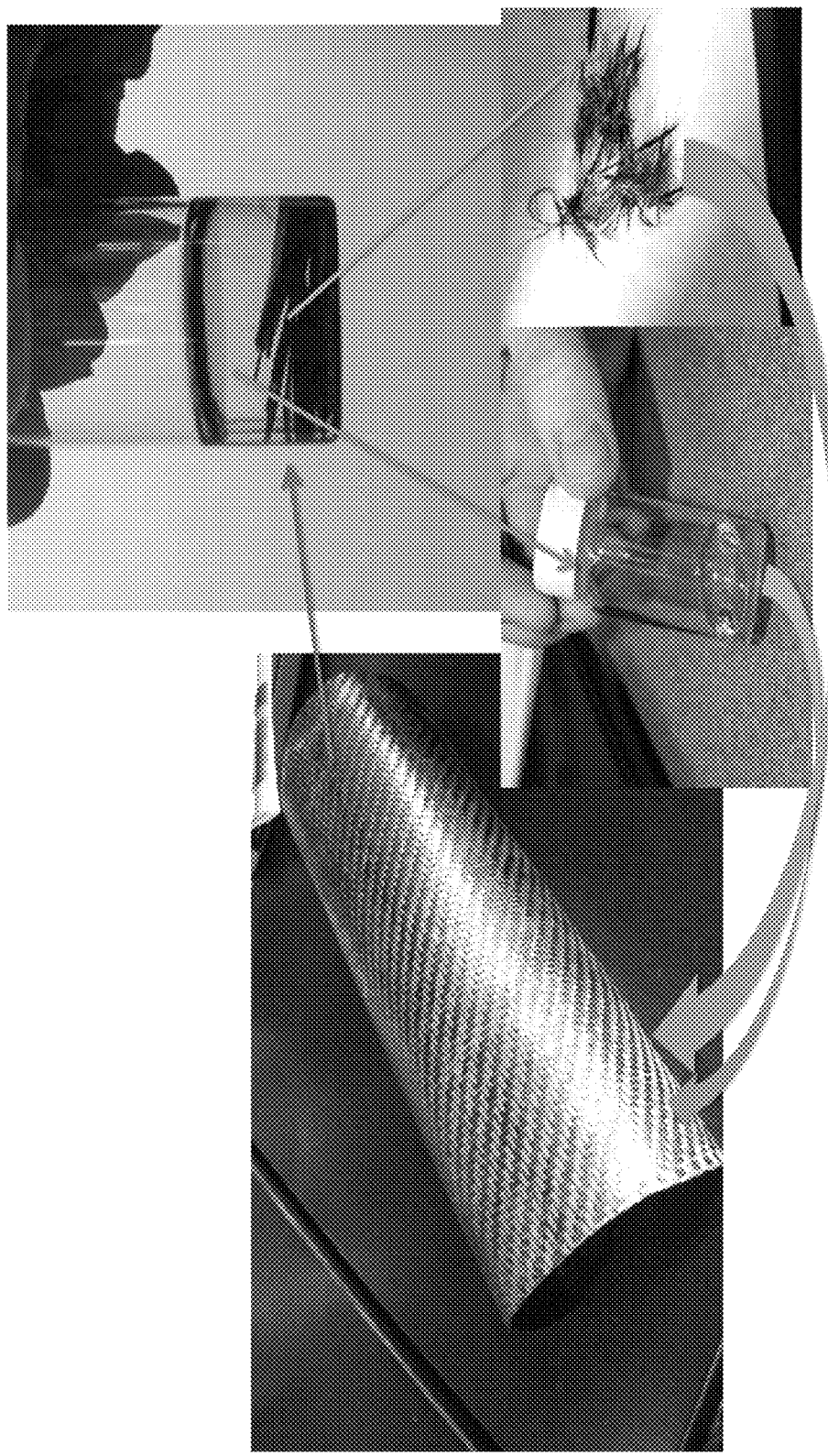
FIG. 26 depicts a schematic representation of a recycling cycle of 1-ply polyimine composite via depolymerization of polyimine using an excess of diamine monomer (liquid).

In another embodiment, the recycled DETA polyimine solution may be used in some other formulation to form a different polyimine, or other imine-containing polymer. FIG. 26 is a series of images that depicts steps of the closed-loop composite recycling process.

Malleable Orthotics

The superior processability of polyimines and polyimine composites disclosed herein allow for the manufacture of remoldable and tough composite materials used for sheet stock material. In an embodiment, polyimine composite sheet stock material can readily intergrate into currently used vacuum-molding and other processes for the preparation of custom orthotics.

In an embodiment, polyimine polymers disclosed herein exhibit a Young's modulus of 1.8 GPa, and a tensile strength of 58 MPa, yet becomes appreciably malleable at approximately 80° C. due to BER, and not a melting transition. Thus polyimine polymers disclosed herein compare very favorably against traditional thermoplastics such as polypropylene, which has a modulus of 1.4 GPa, and tensile strength of 36 MPa, but has a melting point near 170° C. Thus, in an embodiment, polyimine materials as disclosed herein are 61% stronger and 28% stiffer (higher modulus) than polypropylene, yet can be molded at a temperature that is 90° C. lower than the melting point of polypropylene. Additionally, as disclosed herein, malleable temperatures of polyimine polymers can be tuned by monomer choice and/or the use of additives.

In an embodiment, and without being bound by theory, the low temperature molding of the non-impregnated polyimine resins as disclosed herein (virgin polymer) will enable high temperature moldability of the composite (as carbon fibers greatly increase the malleable temperature of the composite as compared to the virgin polymer material).

In an embodiment, compositions of and methods for making an advanced composite material which enables layer-by-layer vacuum molding of a polyimine composite with no curing step, and no VOC are disclosed. In an embodiment, by using methods of designing the properties of polyimine polymers disclosed herein, the material will not change shape under the extremes of normal operating conditions, for example 130° F. for 8 hrs, simulating the inside of a car on a hot summer day.

Composite Formulations

In a prophetic example, for each of the polyimine polymer formulations, composite materials will be prepared using carbon fiber of various forms (twill weave, square weave, nonwoven linear, & nonwoven random). The polyimine binder-to-filler ratio will be varied from 1:9 to 9:1 for each formulation and the resulting materials' moldability and mechanical properties can be characterized.

In a prophetic example, a method will be devised for combining the composite layers under normal molding conditions. If necessary, a lower molding temperature formulation will be coated on the surface of a material to ensure the integrity of the multi-layer devices.

In a prophetic example, completed devices will be tested for fatigue/hysteresis over tens of thousands of repeated stresses (such as simulating walking), and moldability/durability. Additionally, samples of the final formulation including any additional coating can be submitted to testing in fulfillment of ISO 10993 including cytotoxicity, skin irritation, and sensitization.

In an embodiment, polyimine polymers useful for making fiber composites can be made using the following component parts:

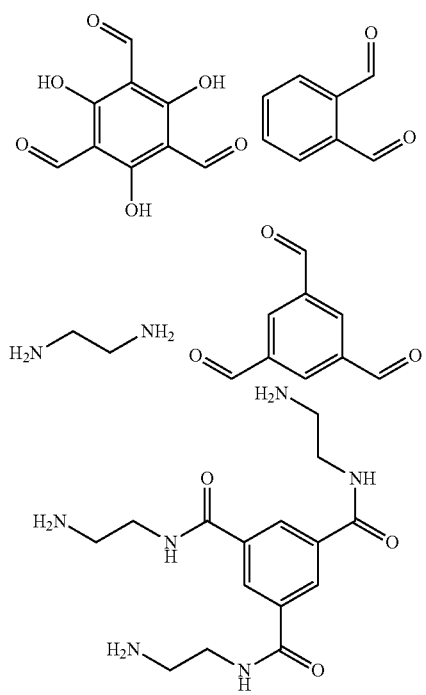

Kits

The material properties of polyimine polymers as disclosed herein represent an ideal system for do-it-yourself prototyping of cross-linked polymeric solids. Using only heat or water and simple molds, strong polymeric structures of any shape can be easily built anywhere. This could have implications for on-demand parts manufacture, and represents an inexpensive small scale object production technology which may be complementary to 3D printing manufacturing. The recyclability of this material means that any object formed retains intrinsic value, as the material can easily be reprocessed by grinding to powder.

The disclosures of each and every patent, patent application, and publication cited herein are hereby incorporated herein by reference in their entirety.

The following examples further illustrate aspects of the present disclosure. However, they are in no way a limitation of the teachings or disclosure of the present disclosure as set forth herein.

Examples

The disclosure is now described with reference to the following Examples. These Examples are provided for the purpose of illustration only, and the disclosure is not limited to these Examples, but rather encompasses all variations that are evident as a result of the teachings provided herein.

Polymer Measurements, Testing and Characterization

The polymers formed using monomers disclosed herein can be characterized by thermogravimetric analysis (TGA), differential scanning calorimetry (DSC), and dynamic mechanical analyzer (DMA). The thermodynamic equilibrium of pairs of model compounds can be correlated with the thermal stability and mechanical properties of the bulk polyimine material.

Differential Scanning Calorimetry

DSC tests were conducted to determine the transition temperatures, including the glass transition temperature ($T_g$). Once $T_g$ is determined, temperatures for stress relaxation tests will be determined. We will then use this as our starting point for choosing temperatures in the stress relaxation tests as described below. The temperatures will be chosen from about 20° C. below the transition temperature then increasing at an increment of 20° C. This will allow us to capture the full relaxation spectrum in the imine system.

In an example of DSC used to characterize polyimines disclosed herein, a DSC measurement was made on a polyimine polymer using a Mettler Toledo DSC823. DSC scan was performed from 125° C. to 25° C. at a scan rate of 5° C./min on a polyimine film sample. The inflection point in the curve as depicted in FIG. 6 was taken to be the glass transition temperature, and was observed near 56° C.

Stress Relaxation Tests

Stress relaxation tests were conducted using a dynamic mechanical analyzer operated in its tensile testing mode. In a stress relaxation test, the sample is first placed between two fixtures, which sit inside a thermal chamber. The temperature in the thermal chamber is then increased to a specific temperature then maintained at that temperature for the rest of the test. Thirty minutes after the target temperature is reached, the sample is stretched by 1% at a very fast strain rate then held at that stretch. The variation of the force is then measured. During the holding, the holding force will decrease due to either the viscosity or BERs. The instantaneous modulus (or relaxation modulus) is defined as the instantaneous holding force divided by the sample cross-section area and the strain and will be used for the investigation of BER kinetics and energy barrier.

Mechanical Testing

A dynamic mechanical analysis (DMA) machine (Model Q800, TA Instruments, New Castle, Del., USA) was used to carry out tension tests at room temperature (23° C. locally). All the samples were trimmed into a uniform size of 12 mm×3 mm×1.1 mm, and then stretched under a constant loading rate (2 MPa/min) until broken.

As an example, for the polymer formed under conditions disclosed herein and by combining the equivalents as depicted in ratios in Scheme 6, the elastic modulus was about 1 GPa, stress at break with about 40 MPa, elongation at break between 4 and 7%.

Scheme 6:

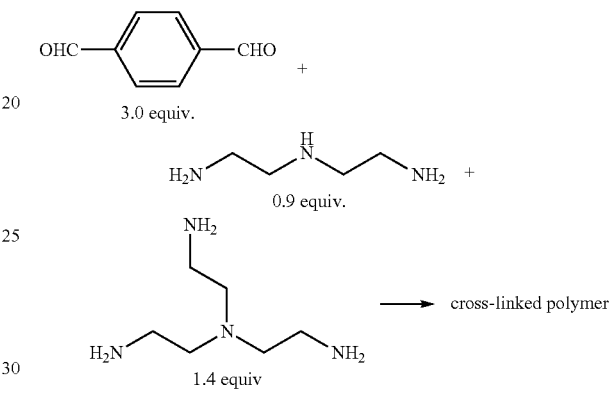

IR Spectra of Polyimines

Polyimine polymer samples for FT-IR measurement were prepared as thin films by drop casting $CH_2Cl_2$ solutions of the analytes onto NaCl plates. The IR spectra were recorded on an Avatar 370. Four scans were averaged for each measurement, and the data was analyzed using Omnisec software. The terephthaldehyde linker had a distinctive C=O stretch absorption band at 1,693 cm$^{-1}$. In the IR spectra of the polyimine (FIG. 8), the C=O stretch absorption band was barely detectable, while a new absorption band at 1,643 cm-1 had become prominent. This band corresponded to the C=N stretch of the newly formed imine bond, indicating the consumption of aldehyde groups, and the formation of imine bonds.

Small Molecule Model Study of a Transamination Reaction

In order to directly observe the behavior of the imine exchange reaction in a non-equilibrium system, and as depicted in Scheme 2 above, compounds aa and bb were mixed in deuterated benzene, and the formation of ab was monitored by $^1$H NMR spectroscopy over time at three different temperatures: 35° C., 45° C., and 60° C.

The $^1$H NMR signal for the methylene groups in aa and bb appeared as singlets at 3.98 ppm and 3.87 ppm, respectively, in CDCl$_3$. The methylene signal of ab was a multiplet at 3.825 ppm (in C$_6$D$_6$). FIG. 9 shows the time-dependent NMR spectrum of the sample recorded at 35° C. The gradual increase of the peak at 3.825 ppm was observed, which corresponds to the methylene group of ab.

Compound aa: Ethylenediamine (100 μL, 1.497 mmol), and benzaldehyde (275 μL, 2.69 mmol) were added to a Schlenk tube containing a magnetic stirbar, CH$_2$Cl$_2$ (15 mL) and 4 Å molecular sieves. The reaction was sealed and stirred at 60° C. in an oil bath for 18 h. The reaction mixture was then allowed to cool to room temperature. The solvent was evaporated, yielding the product with a small excess of unreacted amine groups. The product's $^1$H NMR data is in good agreement with previously reported literature values (Kise, et al., 1995, J. Org. Chem. 60:3980): $^1$H NMR, 500 MHz (CDCl$_3$) δ 3.98 ppm (s, 4H), δ 7.39 ppm (m, 6H), δ 7.69 ppm (m, 4H), δ 8.29 ppm (s, 2H).

Compound bb: The compound was prepared following the similar procedure described for compound aa. Using ethylenediamine (100 μL, 1.497 mmol), 4-bromobenzaldehyde (0.4986 g, 2.69 mmol), and CH$_2$Cl$_2$ (15 mL), the product with a small excess of unreacted amine groups was obtained. The $^1$H NMR data is in good agreement with previously reported literature values (Kise, et al., 1995, J. Org. Chem. 60:3980): $^1$H NMR, 500 MHz (CDCl$_3$) δ 3.95 ppm (s, 4H), δ 7.53 ppm (dd, 8H, JF15 Hz, h=5 Hz), δ 8.21 ppm (s, 2H).

Compound ab: Compound aa (0.1206 g, 0.51 mmol), and bb (0.2 g, 0.51 mmol) were added to a 3 mL vial. Deuterated benzene (1.5 mL) was then added, and the reactants were allowed to dissolve. The vial was then heated in an oil bath at 35° C., 45° C., or 60° C. The reaction was monitored by $^1$H NMR. Each sample eventually reached an equilibrium concentration of ab approximately equal to the combined concentrations of aa & bb. The formation of ab was confirmed by electrospray ionization mass spectroscopy by direct infusion on a Waters SYNAPT G2 instrument (calculated for C$_{16}$H$_{16}$N$_2$Br+[M+H+]: 315.1; observed: 315.1).

Solid State NMR of Polyimine Polymers when Wet and when Dry

Solid-State, Cross-Polarization Magic Angle Spinning (CPMAS), $^{13}$C NMR spectroscopy was performed using a Varian INOVA-400 (Agilent Technologies, Inc.) spectrometer operating at 100.63 MHz for $^{13}$C observation. The probe incorporates a 5 mm Magic Angle Spinning module and coil assembly designed and constructed by Revolution NMR, Inc. (Fort Collins, Colo.), capable of spinning up to 13 KHz with Zirconia rotors (also from Revolution NMR, Inc.). Spectra were acquired using cross-polarization spin-lock and decoupling Rf fields of 80.5 KHz, and TPPM (Time Proportional Phase Modulation) decoupling was applied during signal acquisition. Chemical shifts were referenced using the absolute, calibrated spectrometer configuration frequency and magnetic field offset, such that the methyl carbons of hexamethylbenzene appear at 17.3 ppm. Sample spinning frequencies from 10.5-11.5 KHz were employed with the sample oriented at the magic angle (54.736 degrees, relative to the magnetic field axis, calibrated using the $^{79}$Br spinning sideband pattern of KBR).

To affect the uniform cross-polarization of $^1$H magnetization to all $^{13}$C nuclei, spectra were acquired using multiple cross-polarization contact times between 500 and 1000 μsec and these were summed to yield the final spectra. These optimal contact times were determined using variable contact-time experiments and were chosen to obtain uniform excitation across all carbon atoms in the molecules of the dry and hydrated samples. Spectra were the result of between 4,096 and 5,120 scans, yielding adequate signal-to-noise ratios to observe the signal from the terminal aldehyde carbons at ~192 PPM vs. TMS.

Hydrolytic Stability Measurements

In a prophetic example, each of many diamine monomers of varying hydrophilicity and hydrophobicity will be reacted with 2 equivalents (1 equivalent per site) benzaldehyde in D$_2$O, and the equilibrium concentrations of imine, and aldehyde will be measured by $^1$H-NMR spectroscopy. Similarly, dialdehyde monomers will be treated with 2 equivalents of n-octylamine in D$_2$O and the equilibrium concentrations of imine and aldehyde will be measured. A polymer will be prepared from the most hydrolysis-stable, and least hydrolysis-stable dialdehydes and diamines respectively. Each of these polymers' stress relaxation and mechanical properties will be measured using a DMA instrument. The polymers will then be immersed in water for 24 h and the measurements repeated. Subsequently, the polymers will be dried in mild conditions (dry box at room temperature), and the measurements repeated to see if the original dry performance can be repeated or if there is permanent decomposition of the network due to hydrolysis. The initially dry polymer will be characterized by solid state $^{13}$C NMR spectroscopy, and this measurement will be repeated using the wet materials. The two measurements will be compared side-by-side for each material in order to get a snapshot of the extent of hydrolysis within each material.

The pH of the model reaction solution will be varied for the monomers discussed above. The effect of pH on the imine-formation equilibrium will be measured. The dry, virgin polymers will be soaked in aqueous solutions of varying pH, and the stress-relaxation rate will be characterized as a function of pH for each of the polymers.

Waterproofing Thermodynamically Unstable Polyimines

In another prophetic example, each of the two most hydrolysable monomers (one diamine and one dialdehyde) will be used to form a polymer with terephthaldehyde and aldehyde crosslinker, and 1,8-octadiamine and amino crosslinker, respectively. Another set of polymers will be formed from similar monomers which incorporate greasy aliphatic C$_{16}$H$_{33}$ side chains. The relative hydrophobicity of each polymer can be determined by contact angle measurements. Each polymer's mechanical and stress-relaxation properties will be measured, and then compared with similar measurements of the material after soaking in water for 24 h. Subsequently the polymers will be submersed in 95° C. water for 24 h, and the measurements repeated. Thus, the effect of hydrophobicity of the network towards hydrolysis will be characterized.

Composite Material with 3D Structure

A composite material using carbon fiber and a polyimine resin as disclosed herein, was made into a hemispherical shape. The images in FIG. 25 depict the following steps that were used to make the hemispherical shape. As depicted in FIG. 26, first, a pattern of slits is cut into a 1-ply composite sheet. Next the positive and negative molds are placed in the oven and heated above 100° C. Next the molds are removed from the oven, and the 1-ply composite sheet is placed between the molds, and left outside the oven as the molds slowly cool to room temp. This shapes the 1 ply composite. To fix the new shape, pieces of hydrophilic 1 (as disclosed herein, see at least FIG. 19) sheet stock are cut to the shape of the overlap tabs, and pressed onto the overlap tabs of the cut and shaped composite.

The molding procedure is repeated and temperature is adjusted as needed to generate a 1-ply shaped composite.

Additional layers of 1-ply composite are added by once again heating the molds, placing the shaped 1-ply composite material in the mold, and placing an additional flat sheet of cut 1-ply composite on top of the preformed "outer layer", then by placing the positive mold on top of the flat sheet to allow the inner layer to be molded to fit inside the outer layer. After the molds are cool, remove the inner layer sheet which should now be shaped but not bonded at the tabs or bonded to the outer layer. A sheet of hydrophilic 1 is cut into an identical pattern but the overlap tabs are removed and placed onto the tab-portions of the inner-layer sheet. The outer layer is removed from the mold and the mold is heated. The mold is removed from the oven, and the outer layer is placed in the negative mold followed by the sheet of hydrophilic 1, followed by the inner layer composite sheet, and finally the positive mold is pressed using the appropriate amount of pressure to shape the sheet of hydrophilic 1. When cool, the 2 layer formed composite object is complete. For additional layers, his procedure is repeated.

In an embodiment of the process to make composite materials with 3D structure, all the layers, as described above, can be combined and heat pressed in a single event.

What is claimed is:

1. A polyimine polymer comprising a backbone comprising monomers covalently linked through imine bonds, wherein said polymer is capable of repeating at least one cycle of transitioning between a non-malleable state and a malleable state, and between a malleable state and a non-malleable state, upon exposure to a temperature range comprising:
    a low temperature range that is below a transitional temperature wherein said polymer exhibits rates of covalent bond exchange reactions that impart a non-malleable state to said polymer; and
    a high temperature range above said transitional temperature wherein said polymer exhibits rates of covalent bond exchange reactions that impart a malleable state to said polymer,
    wherein said transition temperature is from about 10° C. to about 250° C., and
    wherein said polyimine polymer does not comprise a catalyst.

2. The polyimine polymer of claim 1 wherein said polymer is a vitrimer.

3. The polyimine polymer of claim 1 wherein said bond exchange reaction is selected from the group consisting essentially of an imine formation reaction, an imine exchange reaction, and an imine hydrolysis reaction.

4. The polyimine polymer of claim 1 wherein said transition temperature is from about 30° C. to about 250° C.

5. The polyimine polymer of claim 1, wherein the stress relaxation of said polyimine polymer exhibits Arrhenius-like temperature dependence.

6. The polyimine polymer of claim 1, wherein said polymer is elastomeric, and capable of strains in excess of 150% elongation.

7. The polyimine polymer of claim 1 wherein said polymer exhibits less than 10% weight increase when immersed in an aqueous solution for 24 hours.

8. The polyimine polymer of claim 1 wherein said polymer is capable of self-healing.

9. The polyimine polymer of claim 1, wherein said polymer is prepared by condensation of at least one dicarbonyl monomer, at least one diamine monomer, and at least one cross-linking agent.

10. The polyimine polymer of claim 9, wherein said at least one dicarbonyl monomer, said at least one diamine monomer, and said at least one cross-linking agent are reacted in amounts such that the molar equivalent ratios for (i) carbonyl groups from the dicarbonyl monomer, (ii) amine groups from the diamine monomer, and (iii) amine groups or carbonyl groups from the cross-linking agent range from about 1:0.99:0.01 to about 1:0.01:0.99.

11. A polyimine polymer comprising a backbone comprising monomers covalently linked through imine bonds, wherein said polymer is capable of repeating at least one cycle of transitioning between a non-malleable state and a malleable state, and between a malleable state and a non-malleable state, upon exposure to a range of relative humidity comprising:
    a low humidity range that is below a transitional relative humidity point wherein said polymer exhibits rates of covalent bond exchange reactions that impart a non-malleable state to said polymer; and
    a high humidity range above said transitional relative humidity point wherein said polymer exhibits rates of covalent bond exchange reactions that impart a malleable state to said polymer.

12. The polyimine polymer of claim 11 wherein said bond exchange reaction is selected from the group consisting essentially of an imine formation reaction, an imine exchange reaction, and an imine hydrolysis reaction.

13. The polyimine polymer of claim 11 wherein said transitional relative humidity point is from about 50 to about 90 percent relative humidity.

14. The polyimine polymer of claim 11, wherein said polyimine polymer does not comprise a catalyst.

15. A composite material comprising a polyimine polymer binder and a filler capable of repeating at least one cycle of transitioning between a non-malleable state and a malleable state and between a malleable state and a non-malleable state, upon exposure to a temperature range comprising:
    a low temperature range that is below a transitional temperature wherein said polymer exhibits rates of covalent bond exchange reactions that impart a non-malleable state to said polymer; and
    a high temperature range above said transition temperature wherein said polymer exhibits rates of covalent bond exchange reactions that impart a malleable state to said polymer.

16. The composite material of claim 15 wherein the ratio of said binder to said filler is from about 9:1 to about 1:9, and wherein said composite material comprises at least one selected from the group consisting of carbon fiber, fiberglass, kevlar, ultra-high molecular weight polyethylene, and carbon nanotubes.

17. A method of processing said composite material of claim 15, said method comprising:
    a.) contacting said composite material with a liquid comprising at least a molecule comprising a primary amine moiety; and
    b.) allowing said composite material to substantially dissolve in said liquid of step a.); and
    c.) separating a polymer solution from a fibrous or non-fibrous filler material.

18. A method for making said composite material of claim 15, said method comprising:
    a.) combining at least one polyimine polymer layer in between at least two plies of composite; and
    b.) heating said combined layers and plies of step a.) to a temperature above said transitional temperature; and
    c.) pressing said heated combined layers and plies of step b.) into a mold; and
    d.) allowing the heated combined layers and plies of step c.) to cool to a temperature below said transitional temperature.

19. The composite material of claim 18 wherein said composite material is an orthotic.

* * * * *